United States Patent
Gentilcore et al.

(10) Patent No.: US 11,593,409 B2
(45) Date of Patent: Feb. 28, 2023

(54) PERMISSIONS-AWARE SEARCH WITH INTELLIGENT ACTIVITY TRACKING AND SCORING ACROSS GROUP HIERARCHIES

(71) Applicant: GLEAN TECHNOLOGIES, INC., Palo Alto, CA (US)

(72) Inventors: Anthony Gentilcore, Belmont, CA (US); Tirunelveli Vishwanath, Sunnyvale, CA (US); Piyush Prahladka, Los Altos, CA (US); Arvind Jain, Los Altos, CA (US); Neboysa Omcikus, Carmichael, CA (US); Cindy Chang, Mountain View, CA (US); Shivaal Roy, Portola Valley, CA (US); Mustafa Tikir, Sunnyvale, CA (US); James Simonsen, Mountain View, CA (US); Sharvanath Pathak, Sunnyvale, CA (US); Eddie Zhou, Palo Alto, CA (US); Sumeet Sobti, Fremont, CA (US); Mrinal Mohit, San Francisco, CA (US); Dragos Florian Ristache, Jersey City, NJ (US); Alice Wang, San Francisco, CA (US); Yiming Jen, San Mateo, CA (US)

(73) Assignee: Glean Technologies, Inc., Palo Alto, CA (US)

( * ) Notice: Subject to any disclaimer, the term of this patent is extended or adjusted under 35 U.S.C. 154(b) by 34 days.

(21) Appl. No.: 17/180,691

(22) Filed: Feb. 19, 2021

(65) Prior Publication Data

US 2022/0269703 A1 Aug. 25, 2022

(51) Int. Cl.
*G06F 16/28* (2019.01)
*G06F 21/31* (2013.01)
(Continued)

(52) U.S. Cl.
CPC .......... *G06F 16/288* (2019.01); *G06F 16/248* (2019.01); *G06F 16/24578* (2019.01);
(Continued)

(58) Field of Classification Search
None
See application file for complete search history.

(56) References Cited

U.S. PATENT DOCUMENTS

| 6,070,158 A | 5/2000 | Kirsch |
| 8,005,816 B2 | 8/2011 | Krishnaprasad |

(Continued)

FOREIGN PATENT DOCUMENTS

| CN | 108156221 A | 6/2018 |
| GB | 2541040 A | 2/2017 |

OTHER PUBLICATIONS

Gentilcore, et al., "Permissions-Aware Search With User Suggested Results," U.S. Appl. No. 17/179,352, filed Feb. 18, 2021.
(Continued)

*Primary Examiner* — Kim T Nguyen
(74) *Attorney, Agent, or Firm* — Tyler Thorp

(57) ABSTRACT

Methods and apparatuses for providing a permissions-aware search and knowledge management system that incorporates user suggested results, document verification, and intelligent user activity tracking across group hierarchies to improve the quality and relevance of search results are described. The permissions-aware search and knowledge management system may enable content stored across a variety of local and cloud-based data stores to be indexed, searched, and displayed to authorized users. The identification and ranking of relevant documents corresponding with a user's search query may take into account user suggested results from the user and others assigned to the same group as the user, whether the underlying content of a search result was
(Continued)

verified by a content owner as being up-to-date, the amount of time that has passed since the underlying content was verified by the content owner, and the recent activity of the user and related group members.

20 Claims, 21 Drawing Sheets

(51) Int. Cl.
G06F 16/248 (2019.01)
G06F 21/62 (2013.01)
G06F 16/2457 (2019.01)

(52) U.S. Cl.
CPC ............ *G06F 16/282* (2019.01); *G06F 21/31* (2013.01); *G06F 21/6227* (2013.01)

(56) References Cited

U.S. PATENT DOCUMENTS

| | | |
|---|---|---|
| 8,239,414 B2 | 8/2012 | Liao |
| 8,725,770 B2 | 5/2014 | Koide |
| 9,098,556 B2 | 8/2015 | Topatan |
| 9,203,925 B1 | 12/2015 | Virochsiri |
| 9,858,437 B2 | 1/2018 | Patil |
| 9,998,472 B2 | 6/2018 | VerWeyst |
| 10,412,095 B2 | 9/2019 | Viswanath |
| 10,440,030 B2 | 10/2019 | Hind |
| 2007/0033191 A1 | 2/2007 | Hornkvist |
| 2008/0168037 A1 | 7/2008 | Kapadia |
| 2013/0238659 A1 | 9/2013 | Roitman |
| 2014/0188894 A1 | 7/2014 | Chechik et al. |
| 2014/0344952 A1 | 11/2014 | Kulick |
| 2015/0113019 A1 | 4/2015 | Jiang |
| 2015/0172293 A1 | 6/2015 | Bittner |
| 2015/0227504 A1 | 8/2015 | Zhang et al. |
| 2016/0225059 A1 | 8/2016 | Chow |
| 2016/0371391 A1 | 12/2016 | Brown et al. |
| 2017/0116552 A1* | 4/2017 | Deodhar ............ G06Q 10/0639 |
| 2018/0096203 A1 | 4/2018 | King et al. |
| 2018/0247072 A1 | 8/2018 | Hind |
| 2018/0285730 A1 | 10/2018 | Zhao et al. |
| 2019/0171683 A1 | 6/2019 | Murphy |
| 2020/0153932 A1 | 5/2020 | Bao et al. |
| 2022/0075836 A1* | 3/2022 | Carbune ............. G06F 16/9538 |
| 2022/0261445 A1* | 8/2022 | Gentilcore ........ G06F 16/90344 |
| 2022/0261492 A1* | 8/2022 | Gentilcore ............ G06F 16/951 |
| 2022/0269703 A1* | 8/2022 | Gentilcore .......... G06F 21/6227 |

OTHER PUBLICATIONS

Gentilcore, et al., "Permissions-Aware Search With Document Verification," U.S. Appl. No. 17/179,348, filed Feb. 18, 2021.

International Search Report and Written Opinion, dated May 10, 2022, for International Application No. PCT/US2022/017094 (19 pages).

Office Action, dated Mar. 2, 2022, for U.S. Appl. No. 17/179,352, (31 pages).

Zhou, et al., "Identification of Permissions-Aware Enterprise-Specific Term Substitutions," U.S. Appl. No. 17/489,772, filed Sep. 29, 2021, (116 pages).

Zhou, et al., "Enterprise Knowledge Assistant With Permissions-Aware Automated Responses," U.S. Appl. No. 17/489,787, filed Sep. 30, 2021, (117 pages).

* cited by examiner

PERMISSIONS-AWARE SEARCH WITH INTELLIGENT ACTIVITY TRACKING AND SCORING ACROSS GROUP HIERARCHIES

BACKGROUND

Members of an enterprise or organization may have access to numerous electronic documents and other data that are stored across various repositories and data stores, such as databases and cloud-based data storage services. The data may comprise unstructured data or structured data (e.g., the data may be stored within a relational database) that is viewable by users authorized to access the data. A search engine may allow the data to be indexed, searched, and displayed to the authorized users. A user of the search engine may provide a textual search query to the search engine and in return the search engine may display the most relevant search results for the search query as links to web pages, images, videos, or electronic documents. To determine the most relevant search results, the search engine may search for relevant information within a search index for the data and then score and rank the relevant information. In some cases, a document indexed by the search engine may have an associated access control list (ACL) that includes access control entries that identify the access rights that the user has to the document. The most relevant search results for the search query that are displayed to the user may comprise links to documents and other digital content that the user is authorized to access in accordance with access control lists for the underlying documents and other digital content.

BRIEF DESCRIPTION OF THE DRAWINGS

Like-numbered elements may refer to common components in the different figures.

DETAILED DESCRIPTION

Figure 1:
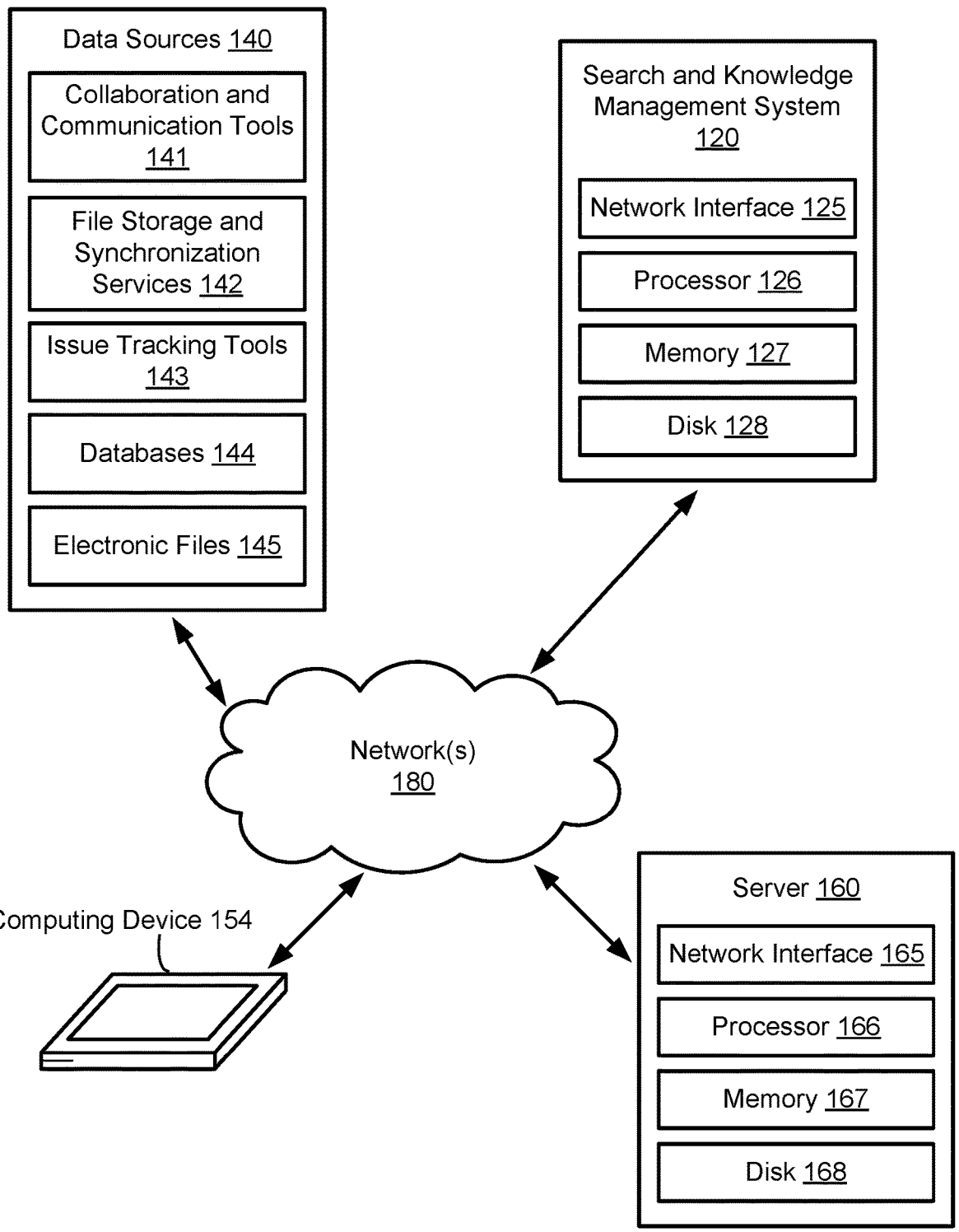
FIG. 1 depicts one embodiment of a networked computing environment.

Technology is described for providing a permissions-aware search and knowledge management system that incorporates user suggested results, document verification, and intelligent user activity tracking across group hierarchies to improve the quality and relevance of search results and to enhance the automated distribution of authorized information within an organization. The permissions-aware search and knowledge management system may enable digital content (or content) stored across a variety of local and cloud-based data stores to be indexed, searched, and displayed to authorized users. The searchable content may comprise data or text embedded within electronic documents, hypertext documents, text documents, webpages, electronic messages, instant messages, database fields, digital images, and wikis. An organization may restrict access to content over time by providing restricted access to different sets of data to different groups of people using access control lists (ACLs) or authorization lists that specify which users or groups of users may access, view, or alter particular sets of data. To determine whether a user executing a search query has sufficient access rights to view particular search results, the permissions-aware search and knowledge management system may determine the access rights via ACLs for sets of data (e.g., for multiple electronic documents) underlying the particular search results at the time that the search is performed or prior to the display of the particular search results to the user.

The permissions-aware search and knowledge management system may identify a number of relevant documents within a search index that satisfy a user's search query. The relevant documents (or items) may be ranked by determining an ordering of the relevant documents from the most relevant document to the least relevant document. A document may comprise any piece of digital content that can be indexed. A variety of different ranking signals may be used to rank the relevant documents for the search query. The identification and ranking of the relevant documents for the user's search query may take into account user suggested results from the user and/or other users (e.g., from co-workers within the same group as the user or co-located at the same level within a management hierarchy), the amount of time that has elapsed since a user suggested result was established, whether the underlying content was verified by a content owner of the content as being up-to-date or approved content, the amount of time that has elapsed since the underlying content was verified by the content owner, and the recent activity of the user and/or related group members (e.g., a co-worker within the same group as the user recently discussing a particular subject related to the executed search query within a messaging application within the past week). The user may be identified by the permissions-aware search and knowledge management system via a unique username or a unique alphanumeric identifier. In some cases, an email address or a hash of the email address for the user may be used as the primary identifier for the user.

One type of user suggested result comprises a document pinning, in which a user or a document owner "pins" a document to a particular search query for a specified period of time. In one example, a user may attach a user-specific search query, such as "my favorite cookie recipe," to a particular document for one month. In another example, a document owner of a recipe document may pin the recipe document to the search query of "Sally's cookies from summer camp" for a three-month time period. The search query for the pinned document specified by the user or document owner may include terms that do not appear within the pinned document. Therefore, document pinning allows the user or document owner to add searchable context to the pinned document that cannot be derived from the document itself. For example, the search query for the pinned document may include a term that comprises neither a word match nor a synonym for any word within the pinned document. The particular search query provided by the user or document owner may be written to a search index entry for the pinned document. The ranking of relevant documents during a search may take into account whether a document comprises a pinned document, the position of the user or document owner that performed the document pinning within an organization, and the relationship between the user or document owner that performed the document pinning and the search user performing the search query. In one example, relevant documents that comprise documents that were pinned to search queries by a first user corresponding with a first position within an organization (e.g., a senior manager) may be elevated over relevant documents that comprise documents that were pinned to search queries by a second user corresponding with a second position that is lower than the first position (e.g., a junior manager that reports to the senior manager). In some cases, the pinning of a document to a particular search query by the document owner may cause the document to be automatically verified as approved content for the specified period of time.

One technical benefit of allowing a user of the permissions-aware search and knowledge management system or a document owner to pin a document to a user-specified search query for a particular period of time (e.g., for the next three months) is that terms that are not found in the document or that cannot be derived from the contents of the document may be specified and subsequently searched in order to find the document, thereby improving the quality and relevance of search results. One technical benefit of allowing a document owner to verify a portion of a document as being up-to-date and containing valid information is that search quality may be improved by increasing the reliability of information provided to search users.

A document owner may verify an entire document or only a portion of the document (e.g., only a paragraph within the document) as content that is deemed current and approved for a specified period of time. The verified information may be relied on by others as being up-to-date. In one example, a document owner of a technical document for a product may verify five paragraphs out of ten paragraphs within the technical document as being current and approved for a one-month time period. Other users may request that the entire document or a specific portion of the document be verified by the document owner. If an unverified document has been provided as a search result that has been selected at least a threshold number of times (e.g., at least ten different users have selected to view the unverified document), then an automatic request for the document owner to verify the document may be transmitted to the document owner. The ranking of relevant documents during a search may take into account whether a document comprises a verified document and also the position of the document owner within an organization. In one example, relevant documents that have been verified by a first user corresponding with a first position within an organization (e.g., a supervisor) may be elevated over relevant documents that have been verified by a second user corresponding with a second position within the organization that reports to the first user (e.g., an employee that reports to the supervisor).

There are several technical issues with determining the most relevant search results for a given search query. For example, if the search query provided by a user is overly broad or lacks sufficient information to identify what the user is looking for, then the search query may match a very large number of search results with low relevance to the user. In this situation, other search queries made by the user within a past period of time (e.g., within the past ten minutes) and the corresponding search results accessed or selected by the user may provide additional information for narrowing the number of relevant search results and improving the quality of the search results. Another technical issue that may lead to low quality search results is that the search query provided by the user may include misspelled words or unique terms that are not recognized within the search index. In this situation, user suggested results may be utilized to map particular content, documents, and electronic messages to various search terms such as project codenames or group identifiers that may not be included within the content, documents, or electronic messages themselves. Another technical issue is that the content within electronic documents and messages may age and become outdated information. In this situation, the content owners of the electronic documents and messages may verify the integrity and validity of the content for a particular period of time (e.g., that particular documentation for an engineering project is valid for one month). The content owners of the electronic documents and messages may also unverify the content within electronic documents and messages if newer content within newer electronic documents and messages has superseded or replaced the content found in the originally verified electronic documents and messages. Another technical issue is that frequent updates may be made to the searchable content that is indexed, to the user access rights to the searchable content, and to the working relationships between search users within an organizational structure or group hierarchy. Over time, electronic documents and messages may be added to or deleted from the searchable content, content within indexed documents may be updated, users may be added to or deleted from the organizational structure, and user access rights to certain documents may be granted or restricted. In this situation, the ranking of search results may be determined based on the search activity and messaging activity of search users that are affiliated with a particular group or a particular project. For example, search relevant content associated with or linked from recent electronic messages within a collaborative messaging application from a co-worker within the same group as a search user may receive boosted rankings.

In some embodiments, the permissions-aware search and knowledge management system may allow a user to search for content and resources across different workplace applications and data sources that are authorized to be viewed by the user. The permissions-aware search and knowledge management system may include a data ingestion and indexing path that periodically acquires content and identity information from different data sources and then adds them to a search index. The data sources may include databases, file systems, document management systems, cloud-based file synchronization and storage services, cloud-based applications, electronic messaging applications, and workplace collaboration applications. In some cases, data updates and new content may be pushed to the data ingestion and indexing path. In other cases, the data ingestion and indexing path may utilize a site crawler or periodically poll the data sources for new, updated, and deleted content. As the content from different data sources may contain different data formats and document types, incoming documents may be converted to plain text or to a normalized data format. The search index may include portions of text, text summaries, unique words, terms, and term frequency information per indexed document. In some cases, the text summaries may only be provided for documents that are frequently searched or accessed. A text summary may include the most relevant sentences, key words, personal names, and locations that are extracted from a document using natural language processing (NLP). The search index may include enterprise specific identifiers, such as employee names, employee identification numbers, and workplace group names, related to the searchable content per indexed document. The search index may also store user permissions or access rights information for the searchable content per indexed document.

The permissions-aware search and knowledge management system may aggregate ranking signals across the different workplace applications and data sources. The ranking signals may include recent search and messaging activity of co-workers of a search user. The ranking signals may also include user suggested results, such as document "pinning" in which an electronic document or message is pinned to a particular search query (e.g., a user-specified set of relevant key words) for a specified period of time (e.g., the document pin will expire after 60 days). The pin may automatically renew if the electronic document or message is accessed at least at a threshold number of times within the specified period of time or if the electronic document or message has been set into a verified state by an owner of the electronic document or message. The user suggested results may also include user "starring" in which a search user may select from a displayed search results page what their preferred search result is for a given search query. The user suggested results including user pinning and user starring may be used to boost the ranking of search results for a particular user, as well as to boost the ranking of search results for others within the same workgroup as the particular user. The permissions-aware search and knowledge management system may utilize natural language processing (NLP) and deep-learning models in order to identify semantic meaning within documents and search queries.

In some embodiments, the permissions-aware search and knowledge management system may incorporate document and message verification by content owners to boost the ranking of verified documents and messages. In this case, a document owner may be asked to verify the relevance of a document on a periodic basis as the document ages or in response to a verification request. The document verification may attach to the entire document or to only a portion of the document (e.g., a co-worker may request verification of only three paragraphs out of 200 paragraphs). The document owner may select a portion of the document and set a document verification expiration date (e.g., stored within metadata of the document) for the selected portion. In some cases, if a threshold number of other users access the document after expiration, then a verification request may be automatically sent to the document owner. Document verification may also be automatically applied without requiring user intervention for a short period of time (e.g., for two weeks) if the document owner makes at least a threshold number of edits to the document. To facilitate the document verification process, document verification may be confirmed by the document owner from a search results page or from the document itself. A non-owner of the document may send a verification request from either the search results page or the document itself. Document verification status symbols may be displayed along with or besides various search results on the search results page (e.g., a green symbol if the document is verified, a yellow yield symbol if the document was verified earlier but has aged, and a red stop sign symbol if the document is out of date or the document verification period has expired).

In some embodiments, the permissions-aware search and knowledge management system may identify user activity information associated with searchable content, such as the number of recent edits, downloads, likes, shares, accesses, and views for the searchable content. For a searchable document, the popularity of the document based on the user activity information may be time dependent and may be determined on a per group basis. The recent activity of a user and fellow group members (e.g., co-workers within the same department or group as the user) may be used to compute a document popularity for the group (or sub-group). A user may be a member of a child group (e.g., an engineering sub-group) that is a member of a parent group (e.g., a group comprising all engineering sub-groups). The document popularity values per group may be stored within the search index and the determination of the appropriate document popularity value to apply during ranking may be determined at search time. In some cases, the time period for gathering user activity statistics may be adjusted based on group size. For example, the time period for gathering user activity statistics may be adjusted from 60 days to 30 days if a sub-group is more than ten people; in this case, smaller groups of less than ten people will utilize user activity statistics over a longer time duration. The level of granularity for the user activity statistics applied to scoring a document may be determined based on the number of people within the sub-group or the number of searches performed by the sub-group. In one example, if there are less than ten people in a sub-group, then global activity statistics or the user activity statistics for the parent group of the sub-group may be applied during the scoring and ranking of relevant documents; otherwise, if there are ten or more people in the sub-group, then the user activity statistics for the sub-group may be applied during the scoring and ranking of relevant documents. In another example, if the number of searches performed by a sub-group is less than 100 within the past day, then global activity statistics or the user activity statistics for the parent group of the sub-group may be applied during the scoring and ranking of relevant documents; otherwise, if the number of searches performed by a sub-group is greater than or equal to 100 within the past day, then the user activity statistics for the sub-group may be applied during the scoring and ranking of relevant documents.

The permissions-aware search and knowledge management system may also incorporate crosslinking by leveraging an organization's communications channel to generate ranking signals for documents (e.g., using whether a document was referenced or linked in an electronic message or posting as a user activity signal for the document). In one example, the message text for a message within a persistent chat channel may comprise user generated content that is linked with a referenced document that is referenced within the message to improve search results for the referenced document. In some cases, the crosslinking of the user generated content comprising the message text with the referenced document may only be created if the message text was generated by the document owner or someone within the same group as the document owner. In one example, a document owner may provide message text (e.g., a description of a referenced document) within a persistent chat channel along with a link to the referenced document; in this case, a crosslinking of the message text with the referenced document may be created because the message text was submitted by the document owner. In some cases, a document owner may be more knowledgeable about the contents of a document and may be more likely to provide a reliable description for the contents of the document. In other cases, the crosslinking of the user generated content comprising the message text with the referenced document may be created irrespective of document ownership of the referenced document.

There are several search user interactions that may be used to establish associations between search queries and corresponding searchable documents for ranking purposes. The associations between a search query and one or more searchable documents may be stored within a table, database, or search index. If a semantically similar search query is subsequently issued, then the ranking of searchable documents with previously established associations may be boosted. These search user interactions may include a user pinning the document to a search query, a user starring a document as the best search result for a search query, a user clicking on a search result link to a document after submitting a search query, and a user discussing a document or linking to the document during a question and answer exchange within a communication channel (e.g., within a persistent chat channel or an electronic messaging channel). If the answer to a question during a conversation exchange within the communication channel included a link or other reference to a document, then the message text associated with the question may be associated with the referenced document.

FIG. 1 depicts one embodiment of a networked computing environment 100 in which the disclosed technology may be practiced. The networked computing environment 100 includes a search and knowledge management system 120, one or more data sources 140, server 160, and a computing device 154 in communication with each other via one or more networks 180. The networked computing environment 100 may include a plurality of computing devices interconnected through one or more networks 180. The networked computing environment 100 may correspond with or provide access to a cloud computing environment providing Software-as-a-Service (SaaS) or Infrastructure-as-a-Service (IaaS) services. The one or more networks 180 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, a data storage system, or a cloud-based data storage system. The one or more networks 180 may include a cellular network, a mobile network, a wireless network, a wired network, a secure network such as an enterprise private network, an unsecure network such as a wireless open network, a local area network (LAN), a wide area network (WAN), the Internet, or a combination of networks.

In some embodiments, the computing devices within the networked computing environment 100 may comprise real hardware computing devices or virtual computing devices, such as one or more virtual machines. The storage devices within the networked computing environment 100 may comprise real hardware storage devices or virtual storage devices, such as one or more virtual disks. The read hardware storage devices may include non-volatile and volatile storage devices.

The search and knowledge management system 120 may comprise a permissions-aware search and knowledge management system that utilizes user suggested results, document verification, and user activity tracking to generate or rank search results. The search and knowledge management system 120 may enable content stored in storage devices throughout the networked computing environment 100 to be indexed, searched, and displayed to authorized users. The search and knowledge management system 120 may index content stored on various computing and storage devices, such as data sources 140 and server 160, and allow a computing device, such as computing device 154, to input or submit a search query for the content and receive authorized search results with links or references to portions of the content. As the search query is being typed or entered into a search bar on the computing device, potential additional search terms may be displayed to help guide a user of the computing device to enter a more refined search query. This autocomplete assistance may display potential word completions and potential phrase completions within the search bar.

As depicted in FIG. 1, the search and knowledge management system 120 includes a network interface 125, processor 126, memory 127, and disk 128 all in communication with each other. The network interface 125, processor 126, memory 127, and disk 128 may comprise real components or virtualized components. In one example, the network interface 125, processor 126, memory 127, and disk 128 may be provided by a virtualized infrastructure or a cloud-based infrastructure. Network interface 125 allows the search and knowledge management system 120 to connect to one or more networks 180. Network interface 125 may include a wireless network interface and/or a wired network interface. Processor 126 allows the search and knowledge management system 120 to execute computer readable instructions stored in memory 127 in order to perform processes described herein. Processor 126 may include one or more processing units, such as one or more CPUs and/or one or more GPUs. Memory 127 may comprise one or more types of memory (e.g., RAM, SRAM, DRAM, EEPROM, Flash, etc.). Disk 128 may include a hard disk drive and/or a solid-state drive. Memory 127 and disk 128 may comprise hardware storage devices.

In one embodiment, the search and knowledge management system 120 may include one or more processors and/or one or more control circuits for performing a permissions-aware search in which a ranking of search results is outputted or displayed in response to a search query. The search results may be displayed using snippets or summaries of the content. In some embodiments, the search and knowledge management system 120 may be implemented using a cloud-based computing platform or cloud-based computing and data storage services.

The data sources 140 include collaboration and communication tools 141, file storage and synchronization services 142, issue tracking tools 143, databases 144, and electronic files 145. The data sources 140 may include a communication platform not depicted that provides online chat, threaded conversations, videoconferencing, file storage, and application integration. The data sources 140 may comprise software and/or hardware used by an organization to store its data. The data sources 140 may store content that is directly searchable, such as text within text files, word processing documents, presentation slides, and spreadsheets. For audio files or audiovisual content, the audio portion may be converted to searchable text using an audio to text converter or transcription application. For image files and videos, text within the images may be identified and extracted to provide searchable text. The collaboration and communication tools 141 may include applications and services for enabling communication between group members and managing group activities, such as electronic messaging applications, electronic calendars, and wikis or hypertext publications that may be collaboratively edited and managed by the group members. The electronic messaging applications may provide persistent chat channels that are organized by topics or groups. The collaboration and communication tools 141 may also include distributed version control and source code management tools. The file storage and synchronization services 142 may allow users to store files locally or in the cloud and synchronize or share the files across multiple devices and platforms. The issue tracking tools 143 may include applications for tracking and coordinating product issues, bugs, and feature requests. The databases 144 may include distributed databases, relational databases, and NoSQL databases. The electronic files 145 may comprise text files, audio files, image files, video files, database files, electronic message files, executable files, source code files, spreadsheet files, and electronic documents that allow text and images to be displayed consistently independent of application software or hardware.

The computing device 154 may comprise a mobile computing device, such as a tablet computer, that allows a user to access a graphical user interface for the search and knowledge management system 120. A search interface may be provided by the search and knowledge management system 120 to search content within the data sources 140. A search application identifier may be included with every search to preserve contextual information associated with each search. The contextual information may include the data sources and search rankings that were used for the search using the search interface.

A server, such as server 160, may allow a client device, such as the computing device 154, to download information or files (e.g., executable, text, application, audio, image, or video files) from the server or to enable a search query related to particular information stored on the server to be performed. The search results may be provided to the client device by a search engine or a search system, such as the search and knowledge management system 120. The server 160 may comprise a hardware server. In some cases, the server may act as an application server or a file server. In general, a server may refer to a hardware device that acts as the host in a client-server relationship or to a software process that shares a resource with or performs work for one or more clients. The server 160 includes a network interface 165, processor 166, memory 167, and disk 168 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, EEPROM, Flash, etc.). Disk 168 may include a hard disk drive and/or a solid-state drive. Memory 167 and disk 168 may comprise hardware storage devices.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity applications to computing devices, such as computing device 154. The networked computing environment 100 may provide access to protected resources (e.g., networks, servers, storage devices, files, and computing applications) based on access rights (e.g., read, write, create, delete, or execute rights) that are tailored to particular users of the computing environment (e.g., a particular employee or a group of users that are identified as belonging to a particular group or classification). An access control system may perform various functions for managing access to resources including authentication, authorization, and auditing. Authentication may refer to the process of verifying that credentials provided by a user or entity are valid or to the process of confirming the identity associated with a user or entity (e.g., confirming that a correct password has been entered for a given username). Authorization may refer to the granting of a right or permission to access a protected resource or to the process of determining whether an authenticated user is authorized to access a protected resource. Auditing may refer to the process of storing records (e.g., log files) for preserving evidence related to access control events. In some cases, an access control system may manage access to a protected resource by requiring authentication information or authenticated credentials (e.g., a valid username and password) before granting access to the protected resource. For example, an access control system may allow a remote computing device (e.g., a mobile phone) to search or access a protected resource, such as a file, webpage, application, or cloud-based application, via a web browser if valid credentials can be provided to the access control system.

In some embodiments, the search and knowledge management system 120 may utilize processes that crawl the data sources 140 to identify and extract searchable content. The content crawlers may extract content on a periodic bases from files, websites, and databases and then cause portions of the content to be transferred to the search and knowledge management system 120. The frequency at which the content crawlers extract content may vary depending on the data source and the type of data being extracted. For example, a first update frequency (e.g., every hour) at which presentation slides or text files with infrequent updates are crawled may be less than a second update frequency (e.g., every minute) at which some websites or blogging services that publish frequent updates to content are crawled. In some cases, files, websites, and databases that are frequently searched or that frequently appear in search results may be crawled at the second update frequency (e.g., every two minutes) while other documents that have not appeared in search results within the past two days may be crawled at the first update frequency (e.g., once every two hours). The content extracted from the data sources 140 may be used to build a search index using portions of the content or summaries of the content. The search and knowledge management system 120 may extract metadata associated with various files and include the metadata within the search index. The search and knowledge management system 120 may also store user and group permissions within the search index. The user permissions for a document with an entry in the search index may be determined at the time of a search query or at the time that the document was indexed. A document may represent a single object that is an item in the search index, such as a file, folder, or a database record.

After the search index has been created and stored, then search queries may be accepted and ranked search results to the search queries may be generated and displayed. Only documents that are authorized to be accessed by a user may be returned and displayed. The user may be identified based on a username or email address associated with the user. The search and knowledge management system 120 may acquire one or more ACLs or determine access permissions for the documents underlying the ranked search results from the search index that includes the access permissions for the documents. The search and knowledge management system 120 may process a search query by passing over the search index and identifying content information that matches the search terms of the search query and synonyms for the search terms. The content associated with the matched search terms may then be ranked taking into account user suggested results from the user and others, whether the underlying content was verified by a content owner within a past threshold period of time (e.g., was verified within the past week), and recent messaging activity by the user and others within a common grouping. The authorized search results may be displayed with links to the underlying content or as part of personalized recommendations for the user (e.g., displaying an assigned task or a highly viewed document by others within the same group).

To generate the search index, a full crawl in which the entire content from a data source is fetched may be performed upon system initialization or whenever a new data source is added. In some cases, registered applications may push data updates; however, because the data updates may not be complete, additional full crawls may be performed on a periodic basis (e.g., every two weeks) to make sure that all data changes to content within the data sources are covered and included within the search index. In some cases, the rate of the full crawl refreshes may be adjusted based on the number of data update errors detected. A data update error may occur when documents associated with search results are out of date due to content updates or when documents associated with search results have had content changes that were not reflected in the search index at the time that the search was performed. Each data source may have a different full crawl refresh rate. In one example, full crawls on a database may be performed at a first crawl refresh rate and full crawls on files associated with a website may be performed at a second crawl refresh rate greater than the first crawl refresh rate.

An incremental crawl may fetch only content that was modified, added, or deleted since a particular time (e.g., since the last full crawl or since the last incremental crawl was performed). In some cases, incremental crawls or the fetching of only a subset of the documents from a data source may be performed at a higher refresh rate (e.g., every hour) on the most searched documents or for documents that have been flagged as having a at least a threshold number of data update errors, or that have been newly added to the organization's corpus that are searchable. In other cases, incremental crawls may be performed at a higher refresh rate (e.g., content changes are fetched every ten minutes) on a first set of documents within a data source in which content deletion occurs at a first deletion rate (e.g., some content is deleted at least every hour) and performed at a lower refresh rate (e.g., content changes are fetched every hour) on a second set of documents within the data source in which content deletion occurs at a second deletion rate (e.g., content deletions occur on a weekly basis). One technical benefit of performing incremental crawls on a subset of documents within a data source that comprise frequently searched documents or documents that have a high rate of data deletions is that the load on the data source may be reduced and the number of application programming interface (API) calls to the data source may be reduced.

Figure 2A:
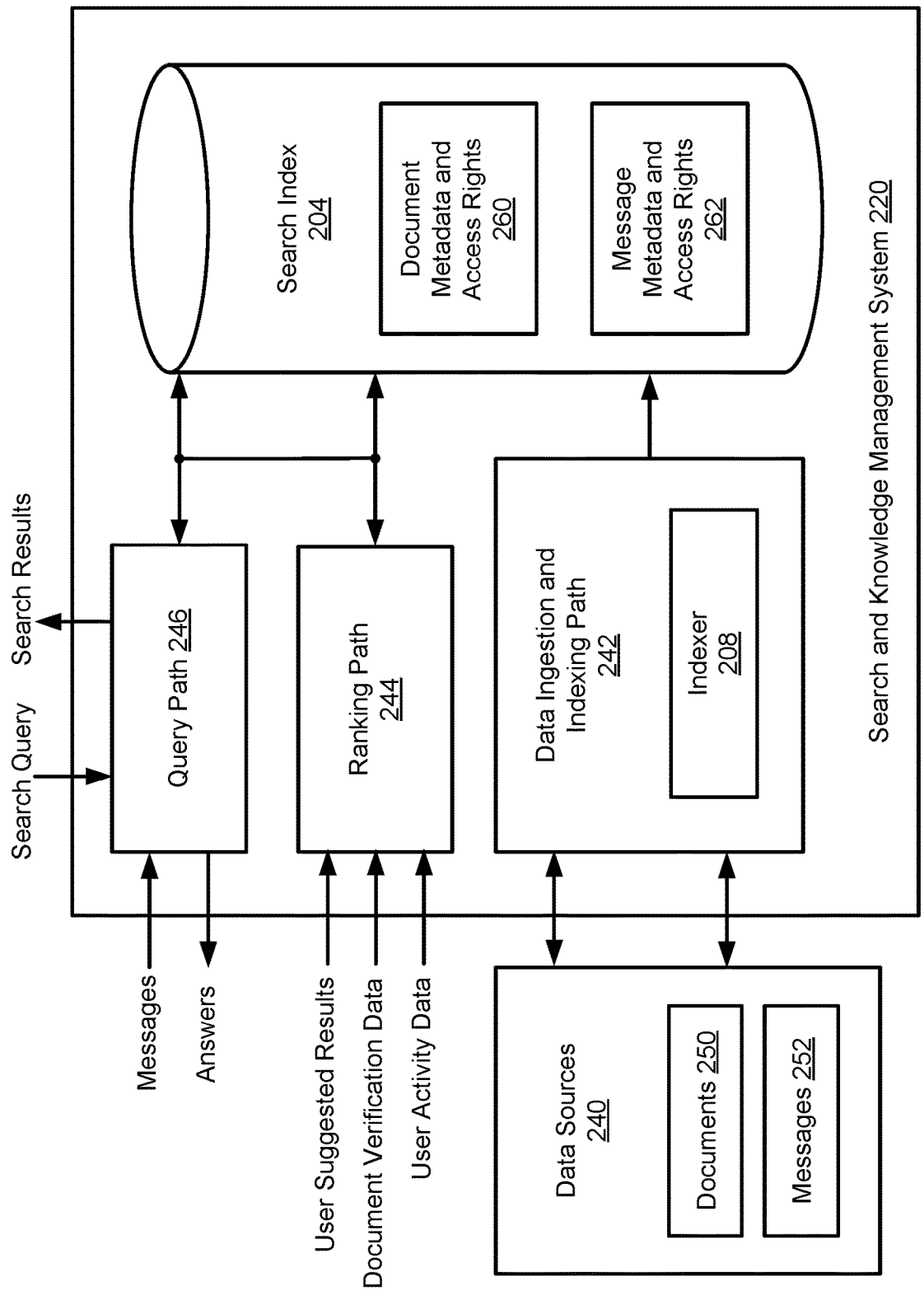
FIG. 2A depicts one embodiment of a search and knowledge management system in communication with one or more data sources.

FIG. 2A depicts one embodiment of a search and knowledge management system 220 in communication with one or more data sources 240. In one embodiment, the search and knowledge management system 220 may comprise one implementation of the search and knowledge management system 120 in FIG. 1 and the data sources 240 may correspond with the data sources 140 in FIG. 1. The data sources 240 may include one or more electronic documents 250 and one or more electronic messages 252 that are stored over various networks, document and content management systems, file servers, database systems, desktop computers, portable electronic devices, mobile phones, cloud-based applications, and cloud-based services.

The search and knowledge management system 220 may comprise a cloud-based system that includes a data ingestion and index path 242, a ranking path 244, a query path 246, and a search index 204. The search index 204 may store a first set of index entries for the one or more electronic documents 250 including document metadata and access rights 260 and a second set of index entries for the one or more electronic messages 252 including message metadata and access rights 262. The data ingestion and index path 242 may crawl a corpus of documents within the data sources 240, index the documents and extract metadata for each document fetched from the data sources 240, and then store the metadata in the search index 204. An indexer 208 within the data ingestion and index path 242 may write the metadata to the search index 204. In one example, if a fetched document comprises a text file, then the metadata for the document may include information regarding the file size or number of words, an identification of the author or creator of the document, when the document was created and last modified, key words from the document, a summary of the document, and access rights for the document. The query path 246 may receive a search query from a user computing device, such as the computing device 154 in FIG. 1, and compare the search query and terms derived from the search query (e.g., synonyms and related terms) with the search index 204 to identify relevant documents for the search query. The query path 246 may also include or interface with an automated digital assistant that may interact with a user of the user computing device in a conversational manner in which answers are outputted in response to messages or questions provided to the automated digital assistant.

The relevant documents may be ranked using the ranking path 244 and then a set of search results responsive to the search query may be outputted to the user computing device corresponding with the ranking or ordering of the relevant documents. The ranking path 244 may take into consideration a variety of signals to score and rank the relevant documents. The ranking path 244 may determine the ranking of the relevant documents based on the number of times that a search query term appears within the content or metadata for a document, whether the search query term matches a key word for a document, and how recently a document was created or last modified. The ranking path 244 may also determine the ranking of the relevant documents based on user suggested results from an owner of a relevant document or the user executing the search query, the amount of time that has passed since the user suggested result was established, whether a document was verified by a content owner, the amount of time that has passed since the relevant document was verified by the content owner, and the amount and type of activity performed with a past period of time (e.g., within the past hour) by the user executing the search query and related group members.

Figure 2B:
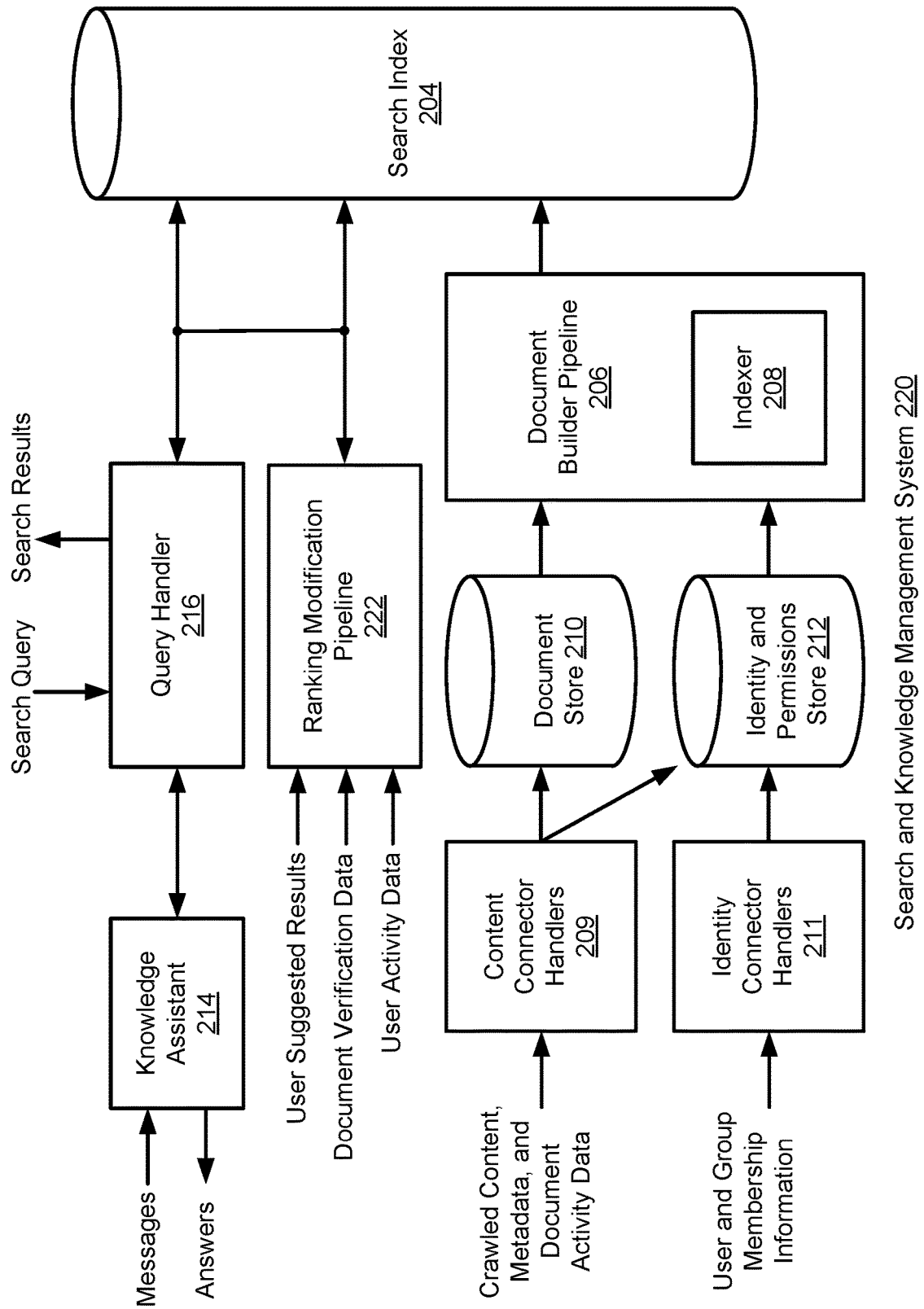
FIG. 2B depicts one embodiment of the search and knowledge management system of FIG. 2A.

FIG. 2B depicts one embodiment of the search and knowledge management system 220 of FIG. 2A. The search and knowledge management system 220 may comprise a cloud-based system that includes a data ingestion and indexing path, a ranking path, a query path, and a search index 204. The components of the search and knowledge management system 220 may be implemented using software, hardware, or a combination of hardware and software. In some cases, a cloud-based task service for asynchronous execution, cloud-based task handlers, or a cloud-based system for managing the execution, dispatch, and delivery of distributed tasks may be used to implement the fetching and processing of content from various data sources, such as data sources 240 in FIG. 2A. In some cases, a cloud-based task service or a cloud-based system for managing the execution, dispatch, and delivery of distributed tasks may be used to acquire and synchronize user and group identifications associated with content fetched from the various data sources. The data sources may have dedicated task queues or shared task queues depending on the size of the data source and the rate requirements for fetching the content. In one example, a data source may have a dedicated task queue if the data source stores more than a threshold number of documents or more than a threshold amount of content (e.g., stores more than 100 GB of data).

The data ingestion and indexing path is responsible for periodically acquiring content and identity information from the data sources 240 in FIG. 2A and adding the content and identity information or portions thereof to the search index 204. The data ingestion and indexing path includes content connector handlers 209 in communication with document store 210. The document store 210 may comprise a key value store database or a cloud-based database service. The content connector handlers 209 may comprise software programs or applications that are used to traverse and fetch content from one or more data sources. The content connector handlers 209 may make API calls to various data sources, such as the data sources 240 in FIG. 2A, to fetch content and data updates from the data sources. Each data source may be associated with one content connector for that data source. The content connector handlers 209 may acquire content, metadata, and activity data corresponding with the content. For example, the content connector handlers 209 may acquire the text of a word processing document, metadata for the word processing document, and activity data for the word processing document. The metadata for the word processing document may include an identification of the owner of the document, a timestamp associated with when the document was last modified, a file size for the document, and access permissions for the document. The activity data for the word processing document may include the number of views for the document within a threshold period of time (e.g., within the past week or since the last update to the document occurred), the number of likes for the document, the number of downloads for the document, and the number of shares associated with the document. The content connector handlers 209 may store the fetched content, metadata, and activity data in the document store 210 and publish the fetch event to a publish-subscribe (pubsub) system not depicted so that the document builder pipeline 206 may be notified that the fetch event has occurred. In response to the notification, the document builder pipeline 206 may process the fetched content and add the fetched content and information derived from the fetched content to the search index 204. The document builder pipeline 206 may transform or augment the fetched content prior to storing the information derived from the fetched content in the search index 204. In one example, the document builder pipeline 206 may augment the fetched content with identity information and synonyms.

Some data sources may utilize APIs that provide notification (e.g., via webhook pings) to the content connector handlers 209 that content within a data source has been modified, added, or deleted. For data sources that are not able to provide notification that content updates have occurred or that cannot push content changes to the content connector handlers 209, the content connector handlers 209 may perform periodic incremental crawls in order to identify and acquire content changes. In some cases, the content connector handlers 209 may perform periodic incremental crawls or full crawls even if a data source has provided webhook pings in the past in order to ensure the integrity of the acquired content and that the search and knowledge management system 220 is consistent with the actual state of the content stored in the data source. Some data sources may allow applications to register for callbacks or push notifications whenever content or identity information has been updated at the data source.

As depicted in FIG. 2B, the data ingestion and indexing path also includes identity connector handlers 211 in communication with identity and permissions store 212. The identity and permissions store 212 may comprise a key value store database or a cloud-based database service. The identity connector handlers 211 may acquire user and group membership information from one or more data sources and store the user and group membership information in the identity and permissions store 212 to enable search results that respect data source specific privacy settings for the content stored using the one or more data sources. The user information may include data source specific user information, such as a data source specific user identification or username. The identity connector handlers 211 may comprise software programs or applications that are used to acquire and synchronize user and/or group identities to a primary identity used by the search and knowledge management system 220 to uniquely identify a user. Each user of the search and knowledge management system 220 may be canonically represented via a unique primary identity, which may comprise a hash of an email address for the user. In some cases, the search and knowledge management system 220 may map an email address that is used as the primary identity for a user to an alphanumeric username used by a data source to identify the same user. In other cases, the search and knowledge management system 220 may map a unique alphanumeric username that is used as the primary identity for a user to two different usernames that are used by a data source to identify the same user, such as one username associated with regular access permissions and another username associated with administrative access permissions. If a data source does not identify a user by the user's primary identity within the search and knowledge management system 220, then an external identity that identifies the user for that data source may be determined by the search and knowledge management system 220 and mapped to the primary identity.

In some cases, the content connector handlers 209 may fetch access rights and permissions settings associated with the fetched content during the content crawl and store the access rights and permission settings using the identity and permissions store 212. For some data sources, the identity crawl to obtain user and group membership information may be performed before the content crawl to obtain content associated with the user and group membership information. When a document is fetched during the content crawl, the content connector handlers 209 may also fetch the ACL for the document. The ACL may specify the allowed users with the ability to view or access the document, the disallowed users that do not have access rights to view or access the document, allowed groups with the ability to view or access the document, and disallowed groups that do not have access rights to view or access the document. The ACL for the document may indicate access privileges for the document including which individuals or groups have read access to the document.

In some cases, a particular set of data may be associated with an ACL that determines which users within an organization may access the particular set of data. In one example, to ensure compliance with data security and retention regulations, the particular set of data may comprise sensitive or confidential information that is restricted to viewing by only a first group of users. In another example, the particular set of data may comprise source code and technical documentation for a particular product that is restricted to viewing by only a second group of users.

As depicted in FIG. 2B, the document store 210 may store crawled content from various data sources, along with any transformation or processing of the content that occurs prior to indexing the crawled content. Every piece of content acquired from the data sources may correspond with a row in the document store 210. For example, when the content connector handlers 209 fetch a spreadsheet or word processing document from a data source, the raw content for the spreadsheet or word processing document may be stored as a row in the document store 210. In addition to the raw content, a row in the document store 210 may also include interaction or activity data associated with the content, such as the number of views, the number of comments, the number of likes, and the number of users who interacted with the content along with their corresponding user identifications. A row in the document store 210 may also include document metadata for the stored content, such as keywords or classification information, and permissions or access rights information for the stored content.

The identity and permissions store 212 may store the primary identity for a user (e.g., a hash of an email address) within the search and knowledge management system 220 and corresponding usernames or data source identifiers used by each data source for the same user. A row in the identity and permissions store 212 may include a mapping from the user identifier used by a data source to the corresponding primary identity for the user for the search and knowledge management system 220. The identity and permissions store 212 may also store identifications for each user assigned to a particular group or associated with a particular group membership. The ACLs that are associated with a fetched document may include allowed user identifications and allowed group identifications. Each user of the search and knowledge management system 220 may correspond with a unique primary identity and each primary identity may be mapped to all groups that the user is a member of across all data sources.

As depicted in FIG. 2B, the data ingestion and indexing path includes document builder pipeline 206 in communication with search index 204. The document builder pipeline 206 may comprise software programs or applications that are used to transform or augment the crawled content to generate searchable documents that are then stored within the search index 204. The document builder pipeline 206 may include an indexer 208 that writes content derived from the fetched content, structured metadata for the fetched content, and access rights for the fetched content to the search index 204.

The searchable documents generated by the document builder pipeline 206 may comprise portions of the crawled content along with augmented data, such as access right information, document linking information, search term synonyms, and document activity information. In one example, the document builder pipeline 206 may transform the crawled content by extracting plain text from a word processing document, a hypertext markup language (HTML) document, or a portable document format (PDF) document and then directing the indexer 208 to write the plain text for the document to the search index 204. A document parser may be used to extract the plain text for the document or to generate clean text for the document that can be indexed (e.g., with HTML tags or text formatting tags removed). The document builder pipeline 206 may also determine access rights for the document and write the identifications for the users and groups with access rights to the document to the search index 204. The document builder pipeline 206 may determine document linking information for the crawled document, such as a list of all the documents that reference the crawled document and their anchor descriptions, and store the document linking information in the search index 204. The document linking information may be used to determine document popularity (e.g., based on how many times a document is referenced or the number of outlinks from the document) and preserve searchable anchor text for target documents that are referenced. The words or terms used to describe an outgoing link in a source document may provide an important ranking signal for the linked target document if the words or terms accurately describe the target document. The document builder pipeline 206 may also determine document activity information for the crawled document, such as the number of document views, the number of comments or replies associated with the document, and the number of likes or shares associated with the document, and store the document activity information in the search index 204.

The document builder pipeline 206 may be subscribed to publish-subscribe events that get written by the content connector handlers 209 every time new documents or updates are added to the document store 210. Upon notification that the new documents or updates have been added to the document store 210, the document builder pipeline 206 may perform processes to transform or augment the new documents or portions thereof prior to generating the searchable documents to be stored within the search index 204.

As depicted in FIG. 2B, the query path includes a query handler 216 in communication with the search index 204 and the ranking modification pipeline 222. A knowledge assistant 214 interacts with the query handler 216 to provide a real-time automated digital assistant that may interact with a user of the search and knowledge management system 220 via a graphical user interface in a conversational manner using natural language dialog. The automated digital assistant may comprise a computer-implemented assistant that may access and display only information that a user's access rights permit.

The query handler 216 may comprise software programs or applications that detect that a search query has been submitted by an authenticated user identity, parse the search query, acquire query metadata for the search query, identify a primary identity for the authenticated user identity, acquire ranked search results that satisfy the search query using the primary identity and the parsed search query, and output (e.g., transfer or display) the ranked search results that satisfy the search query or that comprise the highest ranking of relevant information for the search query and the query metadata. The search query may be parsed by acquiring an inputted search query string for the search query and identifying root terms or tokenized terms within the search query string, such as unigrams and bigrams, with corresponding weights and synonyms. In some cases, natural language processing algorithms may be used to identify terms within a search query string for the search query. The search query may be received as a string of characters and the natural language processing algorithms may identify a set of terms (or a set of tokens) from the string of characters. Potential spelling errors for the identified terms may be detected and corrected terms may be added or substituted for the potentially misspelled terms.

The query metadata may include synonyms for terms identified within the search query and nearest neighbors with semantic similarity (e.g., with sematic similarity scores above a threshold that indicate their similarity to each other at the semantic level). The semantic similarity between two texts (e.g., each comprising one or more words) may refer to how similar the two texts are in meaning. A supervised machine learning approach may be used to determine the semantic similarity between the two texts in which training data for the supervised step may include sentence or phrase pairs and the associated labels that represent the semantic similarity between the sentence or phrase pairs. The query handler 216 may consume the search query as a search query string, and then construct and issue a set of queries related to the search query based on the terms identified within the search query string and the query metadata. In response to the set of queries being issued, the query handler 216 may acquire a set of relevant documents for the set of queries from the search index 204. The set of relevant documents may be provided to the ranking modification pipeline 222 to be scored and ranked for relevance to the search query. After the set of relevant documents have been ranked, a subset of the set of relevant documents may be identified (e.g., the top thirty ranked documents) based on the ranking and summary information or snippets may be acquired from the search index 204 for each document of the subset of the set of relevant documents. The query handler 216 may output the ranked subset of the set of relevant documents and their corresponding snippets to a computing device used by the authenticated user, such as the computing device 154 in FIG. 1.

Moreover, when a user issues a search query, the query handler 216 may determine the primary identity for the authenticated user and then query the identity and permissions store 212 to acquire all groups that the user is a member of across all data sources. The query handler 216 may then query the search index 204 with a filter that restricts the retrieved set of relevant documents such that the ACLs for the retrieved documents permit the user to access or view each of the retrieved set of relevant documents. In this case, each ACL should either specify that the user comprises an allowed user or that the user is a member of an allowed group.

The search index 204 may comprise a database that stores searchable content related to documents stored within the data sources 240 in FIG. 2A. The search index 204 may store text, title strings, chat message bodies, metadata, and access rights related to searchable content. For each searchable document, portions of text associated with the document, extracted key words, document classifications, and document summaries may be stored within the search index 204. For searchable electronic messages (e.g., searchable chat messages or email messages), the title, the message body of the original message, and the message bodies of related messages may be stored within the search index 204. For searchable question and answer responses, the message body of the question and the message body of the answer may be stored within the search index 204. A question and answer pair may derive from questions and answers made by the user or made by other users (e.g., co-workers) during a conversation exchange within a persistent chat channel or from dialog between an artificial intelligence powered digital assistant and the user within a chat channel. One example of an artificial intelligence powered digital assistant is the knowledge assistant 214 that may automatically output answers to messages or questions provided to the digital assistant. Text associated with other documents linked to or referenced by a searchable document, electronic message, or question and answer pair may also be stored within the search index 204 to provide context for the searchable content. Content access rights including which users and groups are allowed to access the content may be stored within the search index 204 for each piece of searchable content.

As depicted in FIG. 2B, the ranking modification pipeline 222 may comprise software programs or applications that are used to score and rank documents and portions of documents. The scoring of a set of relevant documents may weight different attributes of the documents differently. In one example, literal matches or lexical matches of search query terms within the body of a message or document may correspond with a first weighting while semantic matches of the search query terms may correspond with a second weighting different from the first weighting (e.g., greater than the first weighting). The matching of search query terms or their synonyms within a message body may be given a first weighting while the matching of the search query terms within a title field or within the text of a referencing document (e.g., anchor text within a source document) may be given a second weighting different from the first weighting (e.g., greater than the first weighting). The scoring and ranking of a set of relevant documents may take into consideration document popularity, which may change over time as a document ages or as the number of views for a document within a past period of time (e.g., within the past week) increases or decreases. A higher document popularity score may increase the ranking of a document, while a lower document popularity score may signal that the document has become stale and that its importance should be demoted. The ranking modification pipeline 222 may score and rank a set of relevant documents based on user suggested results submitted by owners of the relevant documents, the document verification statuses of the relevant documents, and the amount and type of user activity performed within a past period of time (e.g., within the past 24 hours) by the user executing a search query and others that are part of a common grouping with the user (e.g., co-workers on the same team or assigned to the same group).

Figure 3A:
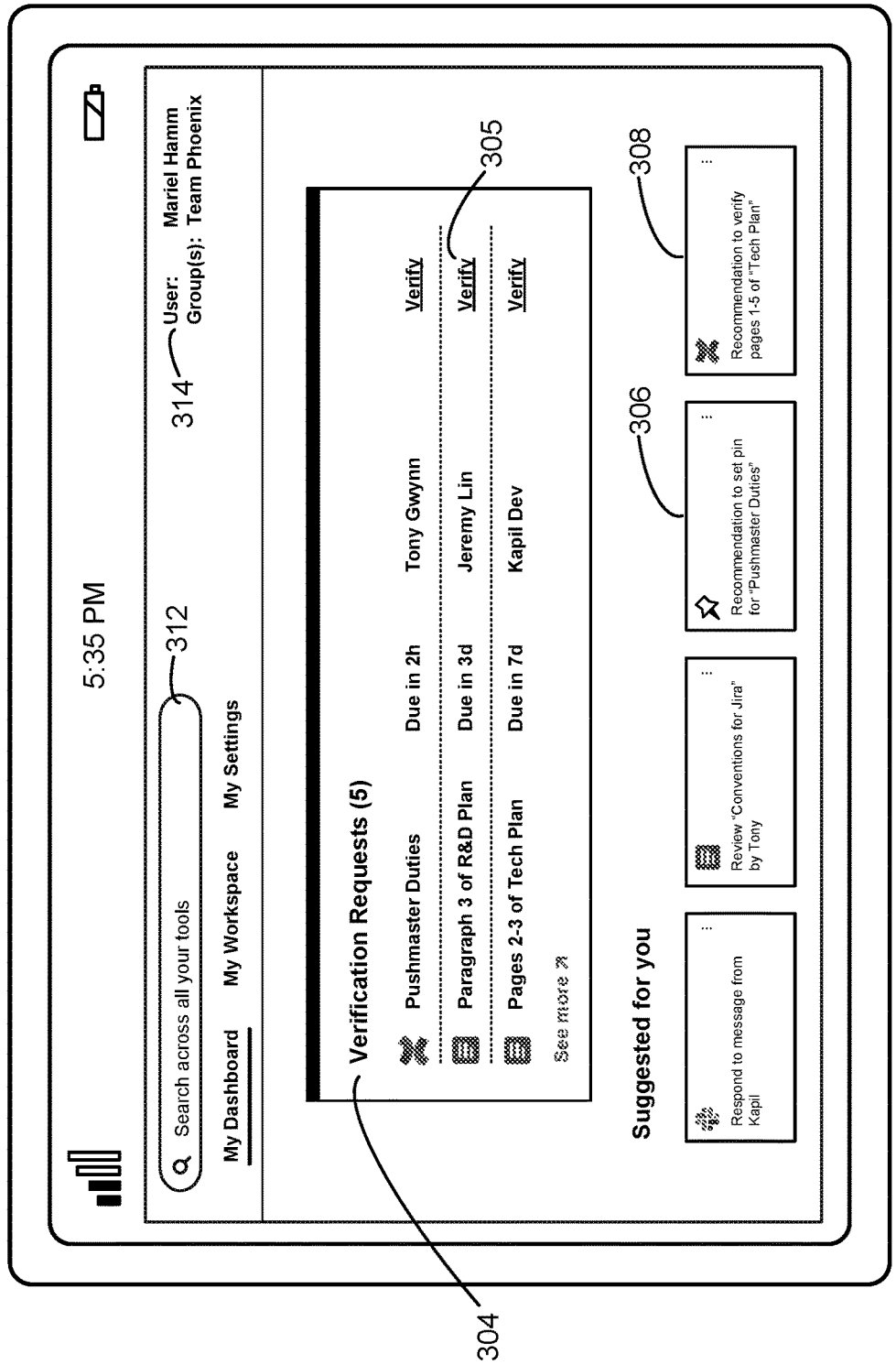
FIG. 3A depicts one embodiment of a mobile device providing a user interface for interacting with a permissions-aware search and knowledge management system.

FIG. 3A depicts one embodiment of a mobile device 302 providing a user interface for interacting with a permissions-aware search and knowledge management system. In one example, the mobile device 302 may correspond with the computing device 154 in FIG. 1. The mobile device 302 may include a touchscreen display that displays a user interface to an end user of the mobile device 302. The mobile device 302 may display device status information regarding wireless signal strength, time, and battery life associated with the mobile device, as well as the user interface for controlling or interacting with the permissions-aware search and knowledge management system. The user interface may be provided via a web-browser or an application running on the mobile device. The user interface may include a search bar 312 that the end user of the mobile device 302 may use to enter and submit a search query with search terms and criteria for the permissions-aware search and knowledge management system. The end user of the mobile device 302 may be associated with a unique user identifier or username 314. The username 314 may map to one or more group identifiers or group names. For example, the username "Mariel Hamm" may map to a single group identifier "Team Phoenix." A username may map to one or more group identifiers (e.g., a username may map to three different group identifiers associated with three different groups).

As depicted in FIG. 3A, a dashboard page "My Dashboard" may display a customized set of items that require urgent action by the user corresponding with the username 314 or that are commonly accessed by the user corresponding with the username 314. The customized set of items include verification requests 304 that comprise document verification requests from other users of the permissions-aware search and knowledge management system for particular documents that are owned by the username 314 to be verified as being up-to-date and approved by the user "Mariel Hamm." The username 314 has ownership permissions or is deemed a document owner for the documents "Pushmaster Duties," "R&D Plan," and "Tech Plan." The document verification requests may request that an entire document be verified or that a portion of a document be verified. For example, as depicted in FIG. 3A, the user "Jeremy Lin" has requested that only paragraph three of the document "R&D Plan" be verified and the user "Kapil Dev" has requested that pages two and three of the document "Tech Plan" be verified. The user of the graphical user interface may select to view and/or verify paragraph three of the document "R&D Plan" by selecting the verify widget or button 305. Along with the document verification requests submitted by the other users, four suggested actions are displayed including a first suggested action 306 that provides an automated recommendation to set a document pin for the document "Pushmaster Duties" and a second suggested action 308 that provides an automated recommendation to verify pages 1-5 of the document "Tech Plan."

In one embodiment, the first suggested action 306 to set a document pin may be automatically generated upon detection that at least a threshold number of other users have accessed (e.g., read or viewed) the document "Pushmaster Duties" and/or at least a threshold number of other users (e.g., at least ten other users) have starred the document "Pushmaster Duties" when performing searches. In another embodiment, the first suggested action 306 to set a document pin may be automatically generated upon detection that at least a threshold number of other users have starred the document "Pushmaster Duties" as their best search result for a given search query when the document "Pushmaster Duties" did not appear within a first number of the search results (e.g., did not appear within the first five search results). In one example, the first suggested action 306 to set a document pin for the document "Pushmaster Duties" may be automatically generated and displayed on the dashboard page in response to detecting that at least ten other users starred the document "Pushmaster Duties" when the document was not within the first three search results for their given search query.

In one embodiment, the second suggested action 308 to verify a portion of a document may be automatically generated upon detection that at least a threshold number of other users have accessed (e.g., read or viewed) the document "Tech Plan" or accessed a particular portion (e.g., a particular page) of the document "Tech Plan." In another embodiment, the second suggested action 308 to verify pages one through five out of fifty total pages for the document "Tech Plan" may be automatically generated upon detection that at least a threshold number of data changes have occurred (e.g., that at least fifty words have been added, deleted, or altered) within pages one through five and/or at least a threshold number of other users have accessed the document "Tech Plan" within a past period of time (e.g., within the past three days).

Figure 3B:
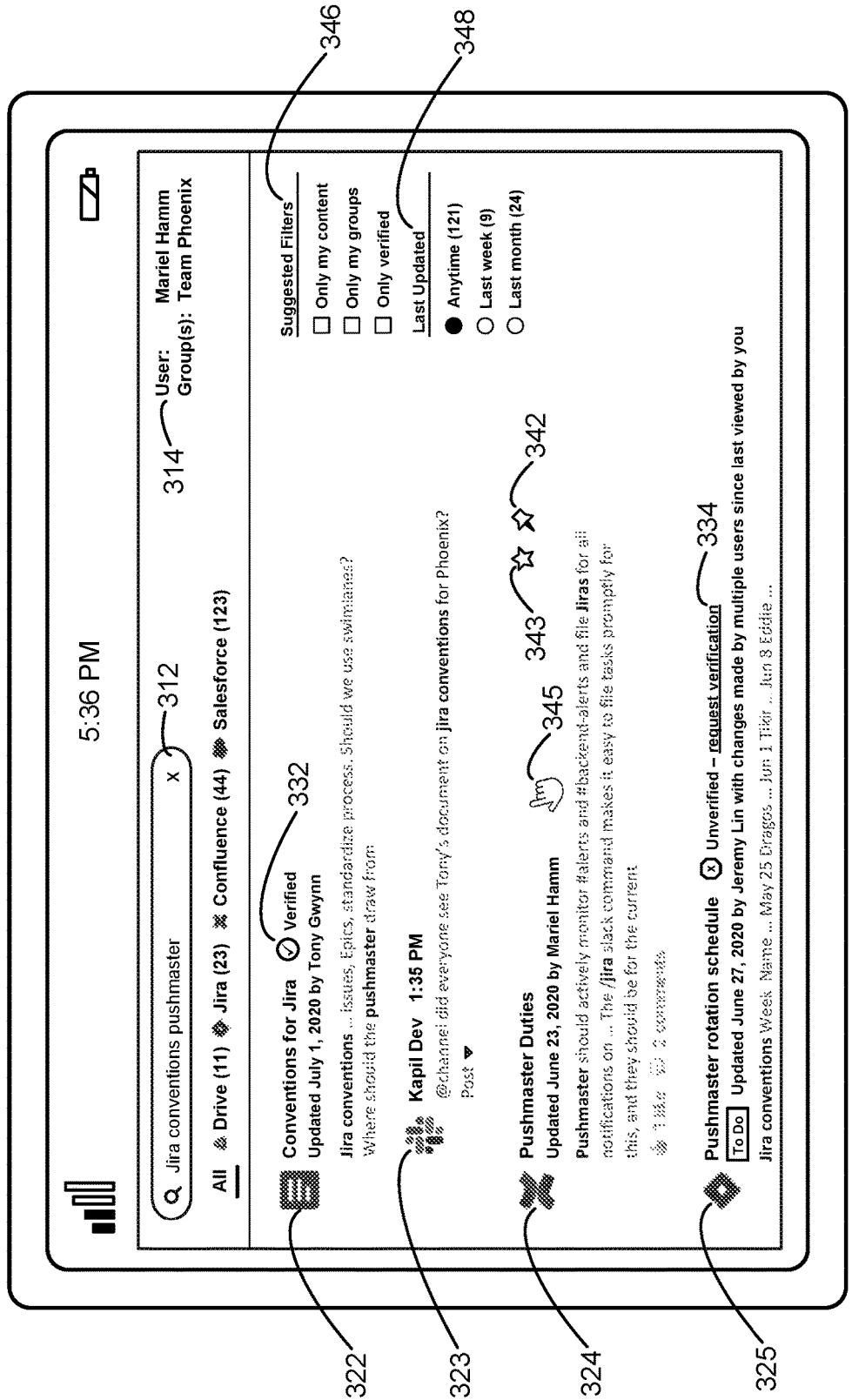
FIG. 3B depicts one embodiment of the mobile device in FIG. 3A providing a user interface for interacting with the permissions-aware search and knowledge management system.

FIG. 3B depicts one embodiment of the mobile device 302 in FIG. 3A providing a user interface for interacting with the permissions-aware search and knowledge management system. As depicted, the user corresponding with the username 314 has entered a search query with the search terms "Jira conventions pushmaster." In response to the entered search query, the permissions-aware search and knowledge management system has generated and displayed four search results that comprise the four most relevant and highest ranked search results for the search query. Each search result may include a link to an underlying document, message, or webpage and a snippet or summary of the relevant information found within the search result. Along with the displayed search results, the user interface also displays suggested filters 346 that allow the user to further narrow or filter the search results to only include "Only my content" content that comprises content that is owned or controlled by the user (e.g., only content for which the user has both read and write permissions), to only include "Only my groups" content that comprises content that is owned or controlled by either the user or other users who belong to the same groups as the user, or to only include "Only verified" content that comprises content that has been verified by the content owners or that has been set into a verified state by their content owners. The user interface also displays a last updated filter 348 that allows the user to further narrow or filter the search results based on when the content was last updated and/or created.

As depicted in FIG. 3B, the search results include a first search result 322 that includes a link to an electronic document "Conventions for Jira" that was last updated on Jul. 1, 2020 by another user "Tony Gwynn." The electronic document "Conventions for Jira" was verified by the document owner and is currently in a verified state as indicated by the verified symbol 332. The search results include a second search result 323 that includes a link to an electronic message that was submitted by another user "Kapil Dev." The electronic message references the electronic document "Conventions for Jira" from the first search result 322 and therefore the display of the second search result 323 is indented to indicate a relationship in which the second search result 323 references or links to the first search result 322. The search results include a third search result 324 that includes a link to a web-based wiki that is authored by the user "Mariel Hamm." As the user has hovered over or positioned a mouse pointer 345 over the third search result 324, the user has the ability to select the pin icon 342 to "pin" the content to a particular search query or to select the star icon 343 to select the third search result 324 as the user's best search result for the entered search query. The particular search query specified by the user may be added to a search index as a key phrase for describing the content. As individuals within an organization may be deemed to be trustworthy, during subsequent searches, matching of the particular search query and/or the terms within the particular search query may cause boosted ranking scores even if the terms within the particular search query do not appear within the underlying content.

As depicted in FIG. 3B, the search results also include a fourth search result 325 that includes a link to an issue and project tracking entry. As the issue and project tracking entry has been visited or accessed by the user and/or other users within the same group "Team Phoenix" as the user at least a threshold number of times (e.g., at least five times), an automatic reminder that the link points to unverified content has been displayed and a verification request widget or button 334 has been provided to send a verification request to the content owners of the issue and project tracking entry. In some embodiments, an electronic document may comprise a collaborative document in which a plurality of users may have read and write access rights; in this case, a verification request may be automatically sent to each of the plurality of users or to only a single designated content owner.

Figure 3C:
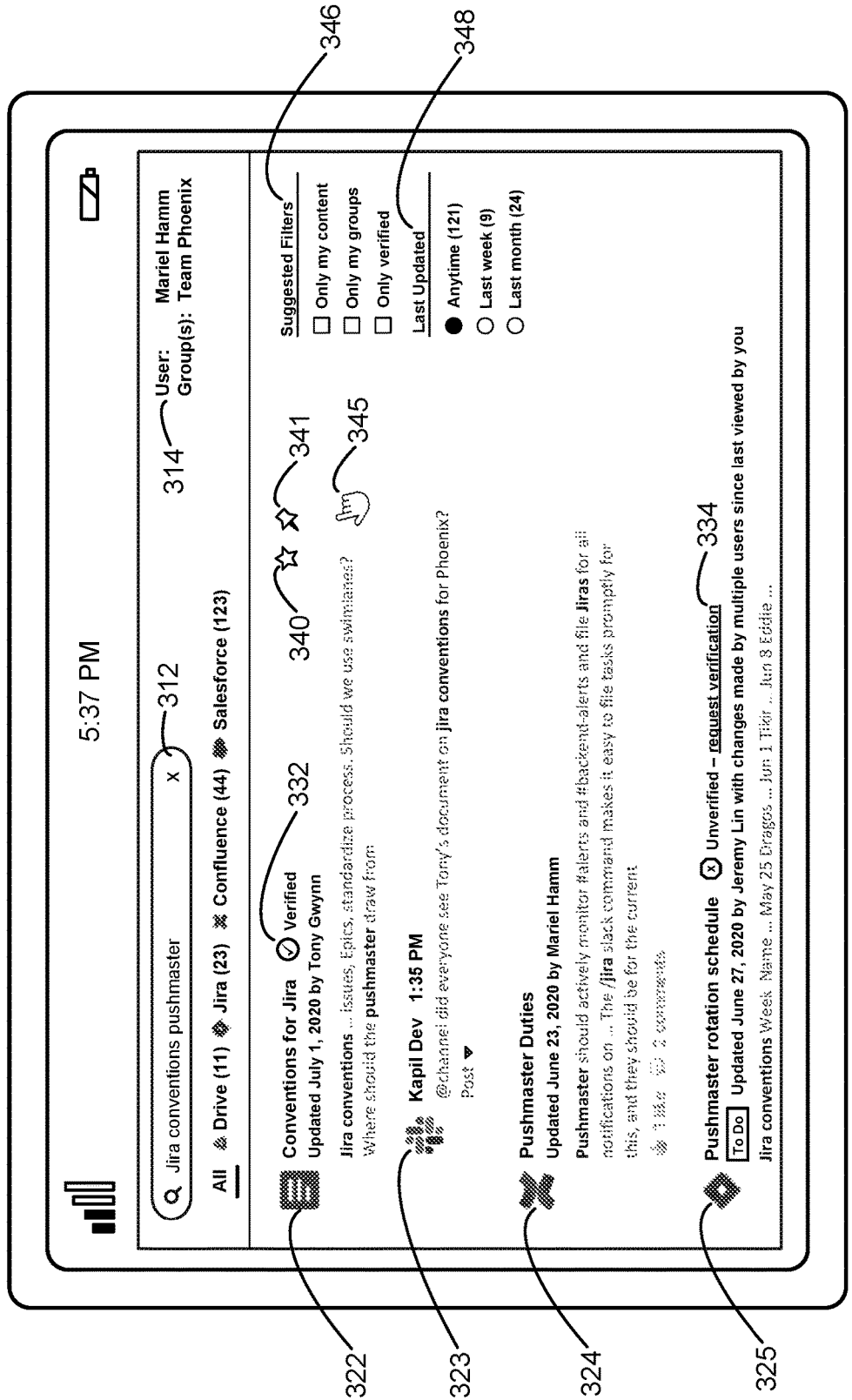
FIG. 3C depicts one embodiment of the mobile device in FIG. 3B after the user has selected and viewed content.

FIG. 3C depicts one embodiment of the mobile device 302 in FIG. 3B after the user has selected and viewed content from the first search result 322 and the fourth search result 325. In some embodiments, after the user has selected a link and accessed the linked contents of a search result, the user interface may display a star icon, such as star icon 340 associated with the first search result 322. In other embodiments, the star icon 340 may be displayed if the search user has hovered over or positioned a mouse pointer 345 over the first search result 322. The user may select the star icon 340 in order to select the first search result 322 as the user's best search result for the entered search query. In one embodiment, the star icon 340 may be automatically selected if the user selected and followed the first search result 322 without returning to the search results page. In another embodiment, a star icon may be automatically selected if the user enters the same search query twice and subsequently follows the same search result twice without returning to the search results page.

Figure 3D:
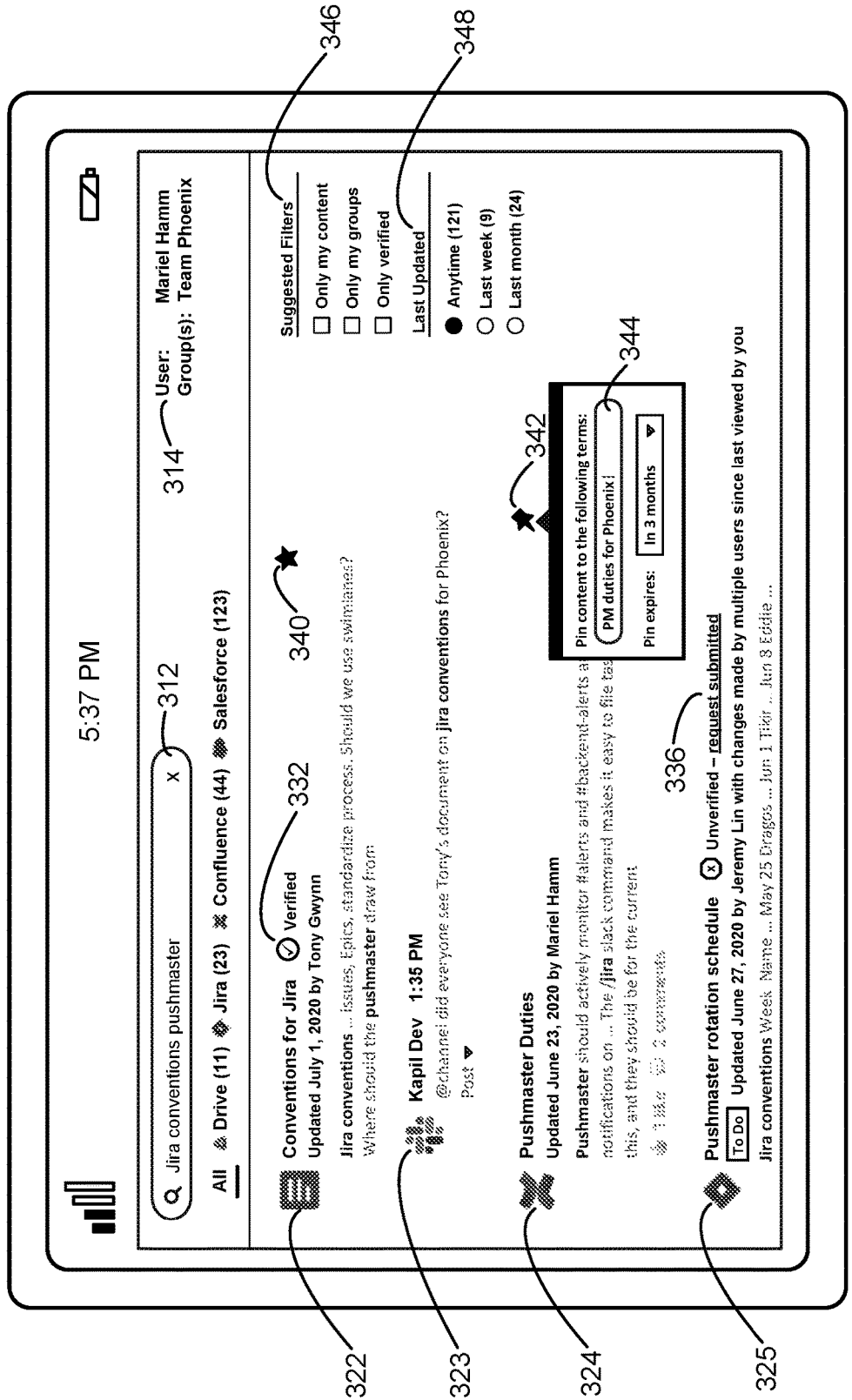
FIG. 3D depicts one embodiment of the mobile device in FIG. 3C after the user has starred a search result and submitted a verification request.

FIG. 3D depicts one embodiment of the mobile device 302 in FIG. 3C after the user has selected the star icon 340 and selected the verification request widget or button 334 in FIG. 3C. In response, the user interface displays that the fourth search result 325 remains unverified and displays a verification request submission widget or button 336 to indicate that a verification request has been submitted to an owner of the content for the fourth search result 325. As depicted, the user has selected the pin icon 342 to pin the content underlying the third search result 324 to the user-specified search query 344 of "PM duties for Phoenix" for a period of three months. In some cases, the user may specify either a particular date or a particular period of time until the pin expires. The user-specified search query 344 includes the acronym "PM" and a term "Phoenix" that are not included within the linked content and that are not derivable from the linked content. The term "Phoenix" may be deemed to not be derivable from the linked content if a semantic match does not exist between the term and the linked content. In some embodiments, the content for the third search result 324 may be pinned to the user-specified search query through the search results page, the dashboard page, or applications for editing or displaying the content.

Figure 3E:
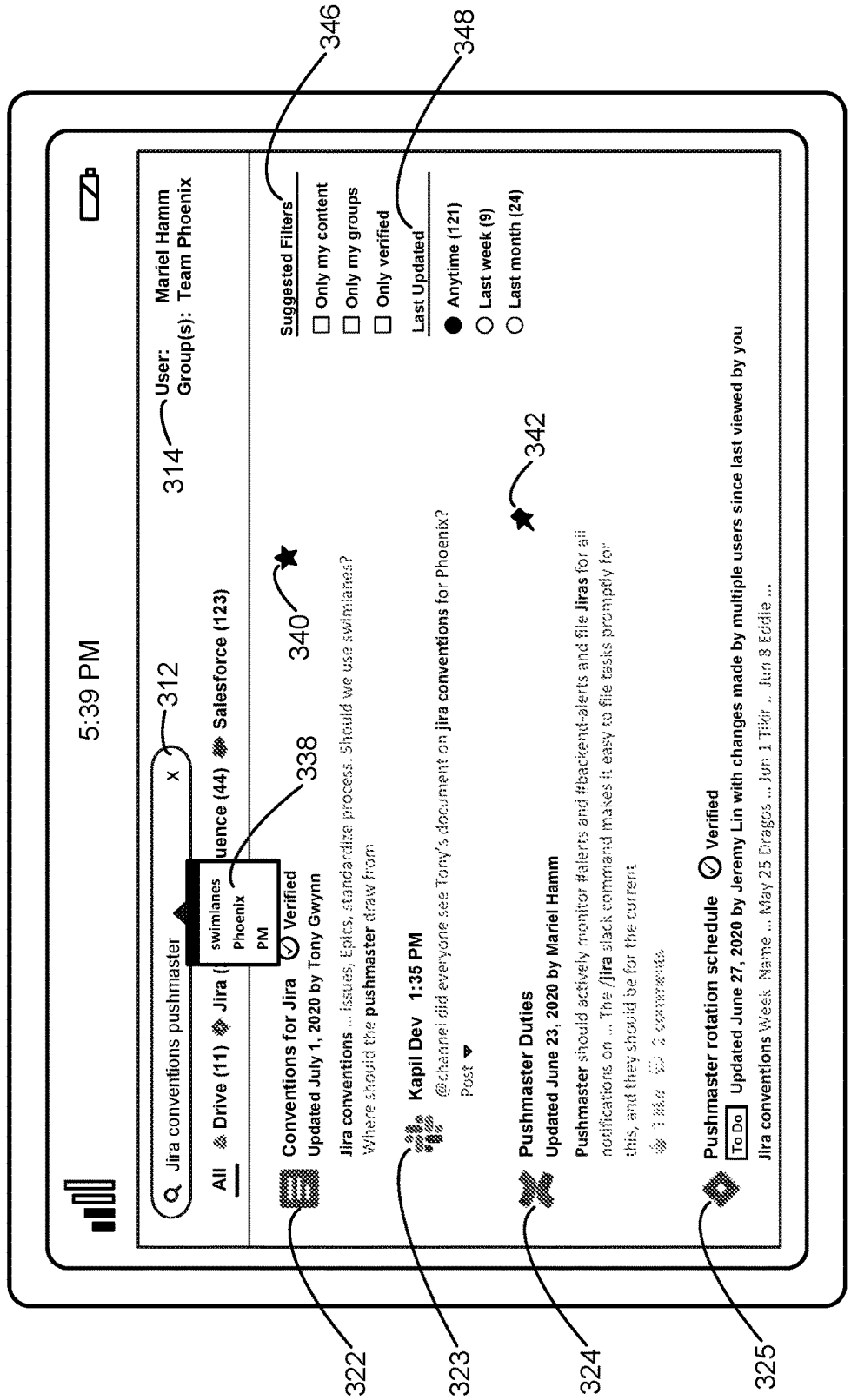
FIG. 3E depicts one embodiment of the mobile device in FIG. 3D after the user has pinned content to a user-specified search query.

FIG. 3E depicts one embodiment of the mobile device 302 in FIG. 3D after the user has pinned the content for the third search result 324 to the user-specified search query 344 in FIG. 3D. As depicted, the user interface may provide potential additional search terms 338 including "swimlanes," "Phoenix," and "PM" to be displayed such that the user may easily view and select a suggested search term to be included within the search terms in the search bar 312. The potential additional search terms 338 may include terms or words that appear in pinned search queries. For example, the acronym "PM" and the term "Phoenix" may be added as potential additional search terms because of the pinned user-specified search query 344 in FIG. 3D. The automatically suggested additional search terms may be customized on a per user or per group basis such that terms coined by the user and terms that are unique to the lexicography of the user's group associations are captured (e.g., acronyms that have meaning to members of Team Phoenix). The potential additional search terms 338 may include terms or words that are only derivable from pinned search queries, such as when those terms or words only appear in pinned search queries from either the user or group members (e.g., other users that are assigned to the same group or group identifier). The potential additional search terms 338 may include terms or words that do not appear or exist within either the underlying content or the metadata for the content. In one embodiment, the potential additional search terms 338 may include terms or words from pinned search queries only if the underlying content has been verified by the content owners.

Figure 3F:
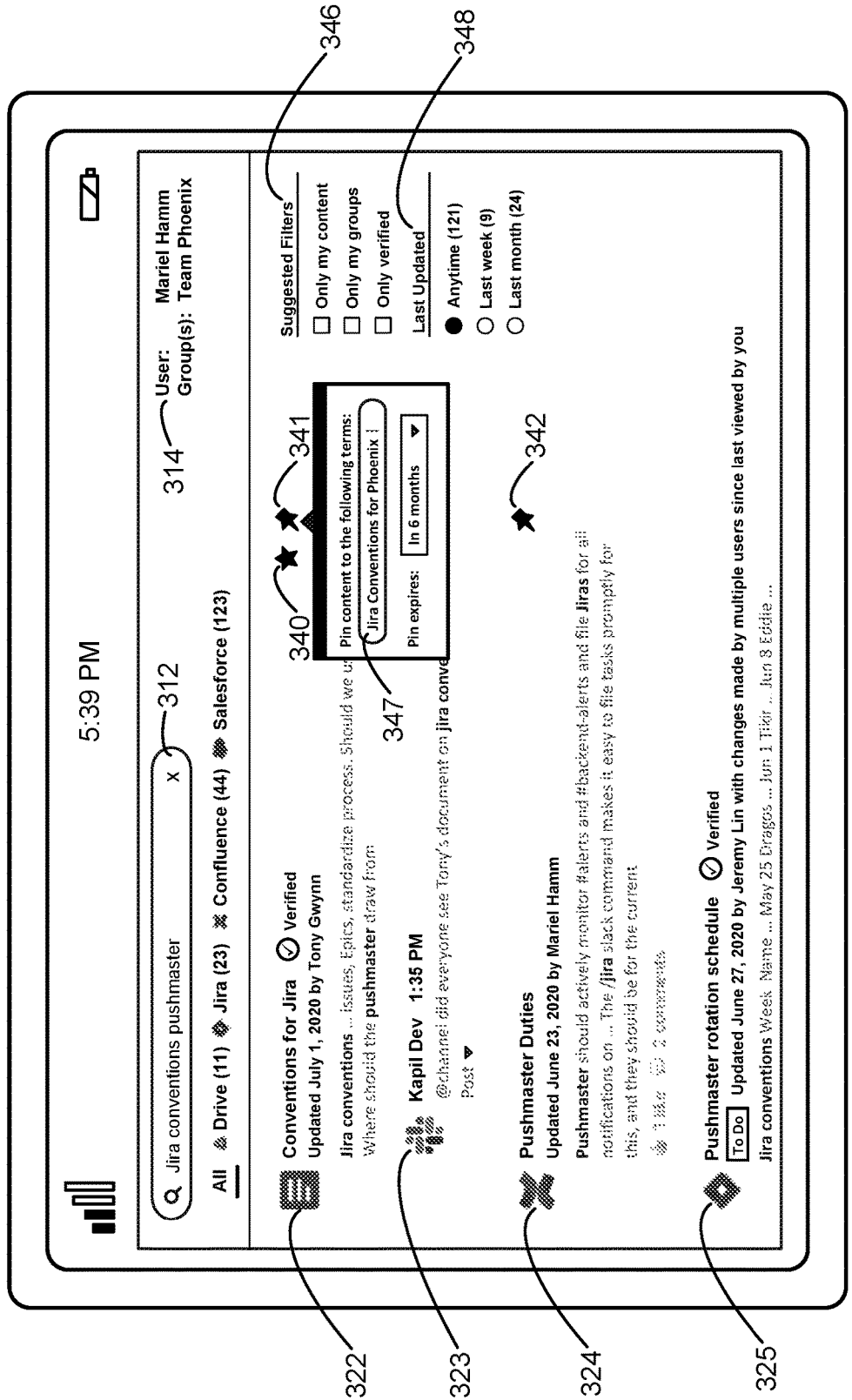
FIG. 3F depicts one embodiment of the mobile device in FIG. 3E after the user has pinned the content for a first search result to a user-specified search query.

FIG. 3F depicts one embodiment of the mobile device 302 in FIG. 3E after the user has pinned the content for the first search result 322 to the user-specified search query 347. As depicted, the user has selected the pin icon 341 to pin the content underlying the first search result 322 to the user-specified search query 347 of "Jira Conventions for Phoenix" for a period of six months. Thus, the search user may pin content to which they do not have ownership permissions to a user-specified search query.

Figure 4A:
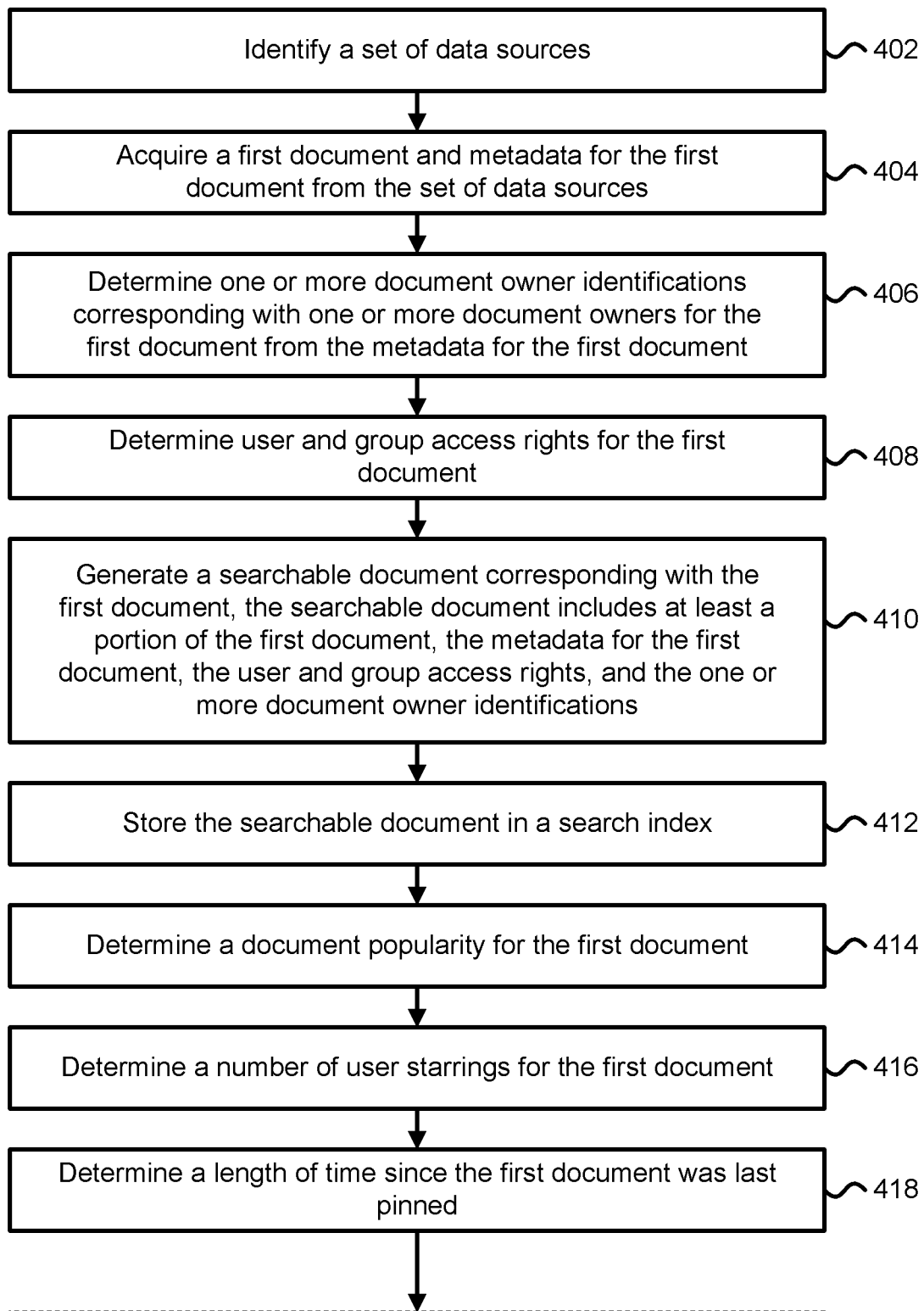
FIGS. 4A-4C depict a flowchart describing one embodiment of a process for aggregating, indexing, storing, and updating digital content that is searchable using a permissions-aware search and knowledge management system.
Figure 4B:
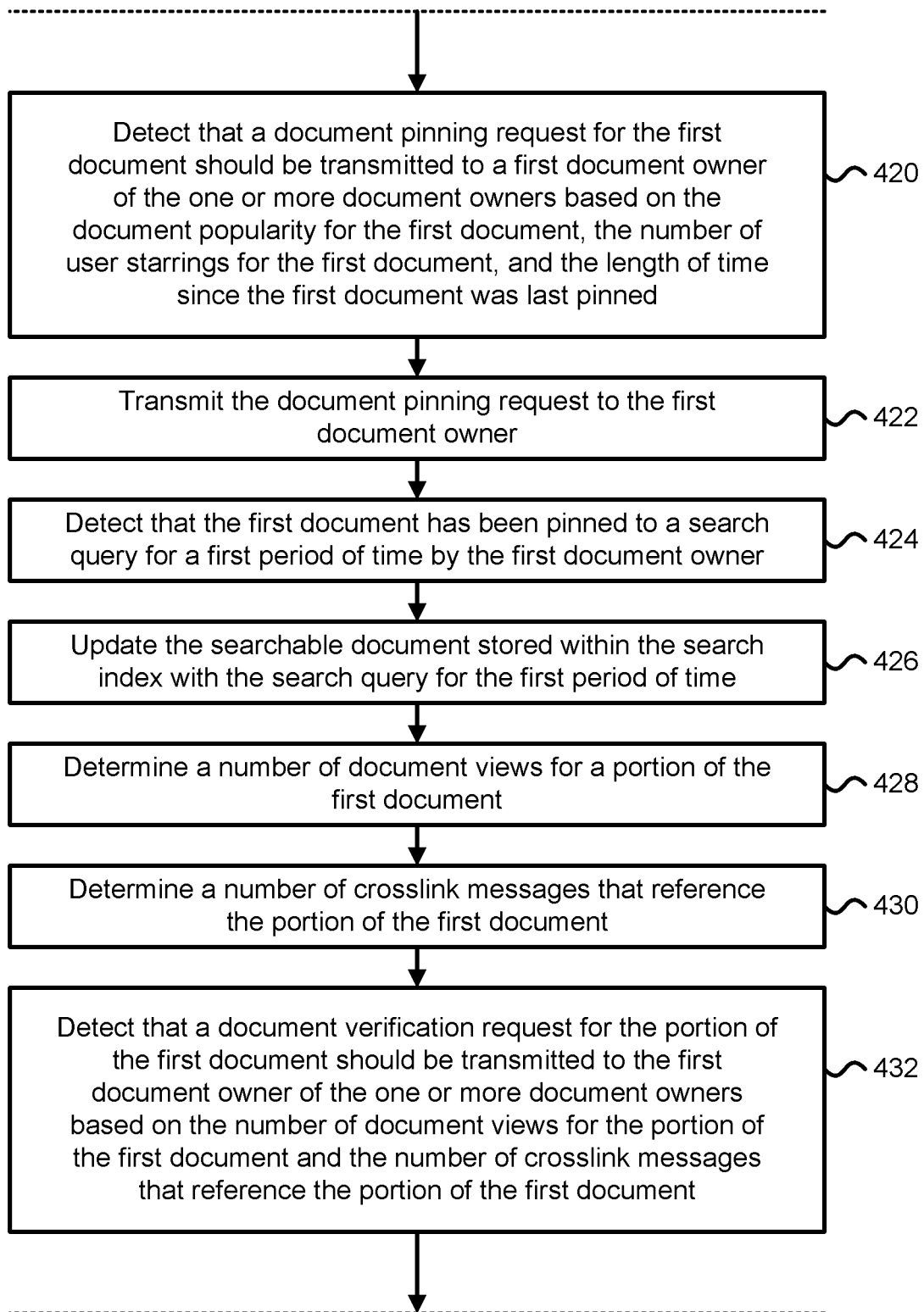
Figure 4C:
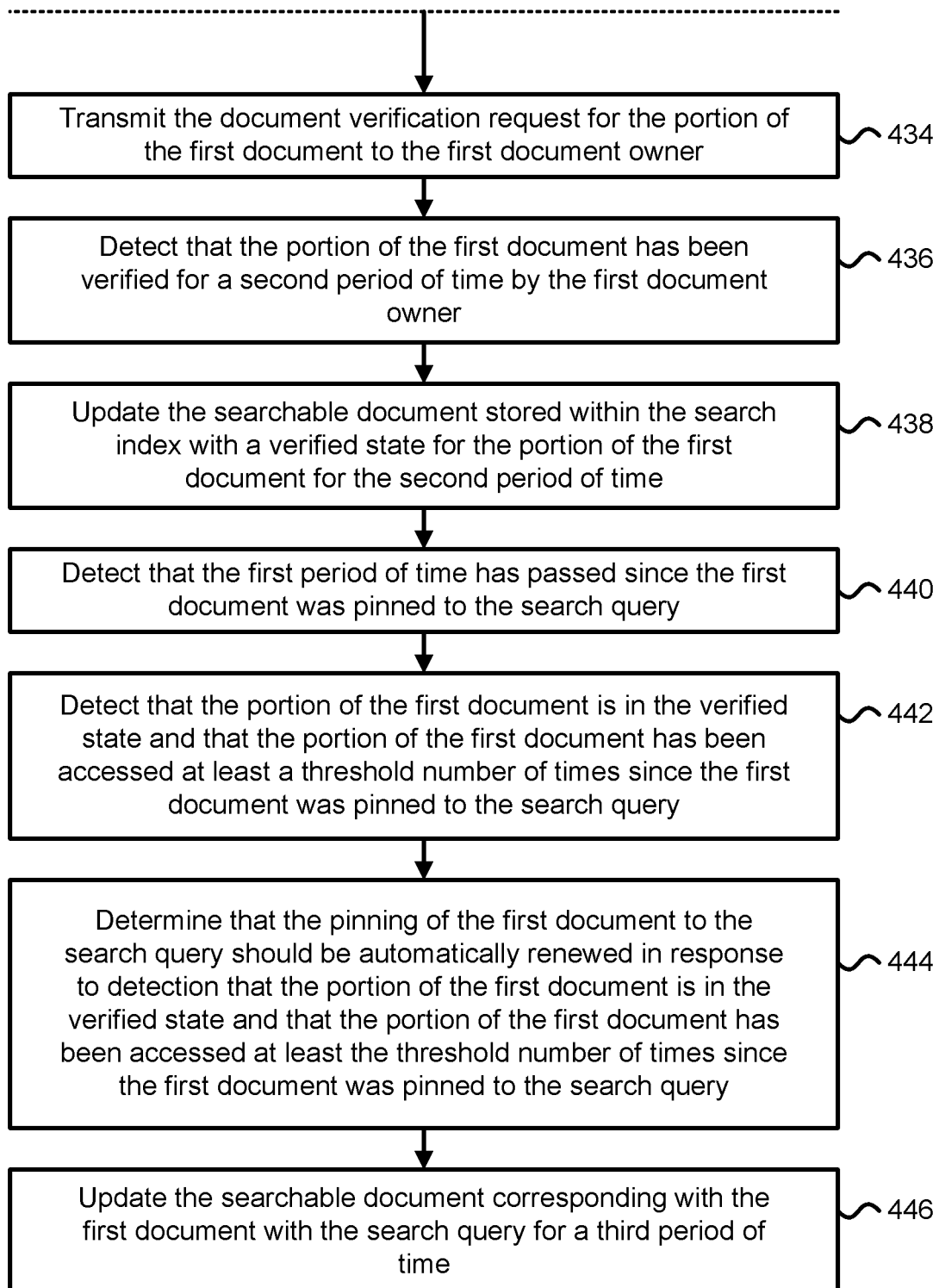

FIGS. 4A-4C depict a flowchart describing one embodiment of a process for aggregating, indexing, storing, and updating digital content that is searchable using a permissions-aware search and knowledge management system. Upon the detection of triggering conditions, the permissions-aware search and knowledge management system may automatically send or transmit document pinning requests and document verification requests to document owners to improve the quality of search results. In one embodiment, the process of FIGS. 4A-4C may be performed by a search and knowledge management system, such as the search and knowledge management system 120 in FIG. 1 or the search and knowledge management system 220 in FIG. 2A. In another embodiment, the process of FIGS. 4A-4C may be performed using a cloud-based computing platform or various cloud-based computing and data storage services.

In step 402, a set of data sources is identified. The set of data sources may correspond with data sources 140 in FIG. 1 or the data sources 240 in FIG. 2A. The set of data sources may comprise one or more sources of digital content including computers, servers, databases, document management systems, cloud-based file synchronization and storage services, cloud-based productivity applications, electronic messaging applications, and team collaboration applications. A search and knowledge management system, such as the search and knowledge management system 220 in FIG. 2A, may detect new data sources that are added to the set of data sources and periodically crawl or poll the set of data sources for new, updated, and deleted digital content. In step 404, a first document and metadata for the first document are acquired from the set of data sources. In one example, the first document may comprise an electronic document and the metadata may include data specifying the file size of the document, the number of words in the document, the number of pages in the document, an identification of the author of the document, a timestamp corresponding with when the document was last updated, and access rights or permissions for the document.

In step 406, one or more document owner identifications corresponding with one or more document owners for the first document are determined from the metadata for the first document. In one example, the one or more document owner identifications may comprise three different usernames associated with three users that have both read and write access to the first document. In another example, the one or more document owner identifications may comprise a single username associated with a user with ownership permissions for the first document. The one or more document owners for the first document may be specified in an access control list for the first document. In step 408, user and group access rights for the first document are determined. The access control list for the first document may specify the users and groups that have read access and write access to the first document. In step 410, a searchable document corresponding with the first document is generated. The searchable document may be generated by a document builder pipeline, such as the document builder pipeline 206 in FIG. 2B, that transforms or augments the first document. The searchable document may include portions of text from the first document, a summary of the contents of the first document, keywords from the first document, and a pinned search query for the first document. In the event that the first document includes two or more document owners, then two or more different pinned search queries corresponding with the two or more document owners may be written to the searchable document. In some cases, the searchable document may include at least a portion of the first document, the metadata for the first document, the user and group access rights for the first document, and the one or more document owner identifications corresponding with the one or more document owners for the first document.

In step 412, the searchable document is stored in a search index. In one example, the search index may correspond with the search index 204 in FIG. 2B. In step 414, a document popularity for the first document is determined. The document popularity may correspond with a number of different users that have accessed the first document within a particular period of time (e.g., within the past week). In step 416, a number of user starrings for the first document is determined. The number of user starrings may comprise the number of different users of the search and knowledge management system that have performed a search and then selected a star icon, such as the star icon 340 in FIG. 3D, to indicate the user's best search result for the entered search query for the search. In step 418, a length of time is determined since the first document was last pinned. In some cases, a document that has been recently pinned (e.g., within the past two days) may receive a boosted ranking or score.

In step 420, it is detected that a document pinning request for the first document should be transmitted to a first document owner of the one or more document owners based on the document popularity for the first document, the number of user starrings for the first document, and/or the length of time since the first document was last pinned. In one example, the document pinning request may correspond with the first suggested action 306 in FIG. 3A to set a document pin. In step 422, the document pinning request is transmitted to the first document owner. In step 424, it is detected that the first document has been pinned to a search query for a first period of time by the first document owner. In step 426, the searchable document stored within the search index is updated with the pinned search query for the first period of time. In one example, the first document may be pinned to a user-specified search query, such as the user-specified search query 344 in FIG. 3D, for a period of three months. In one embodiment, the pinned search query may include one or more terms that are added as heavily weighted keywords for the first document.

In step 428, a number of document views for a portion of the first document is determined. In one example, the number of document views for the portion of the first document may correspond with the number of document views (or document accesses) made by group members that belong to the same group as a user of the search and knowledge management system. In step 430, a number of crosslink messages that reference the portion of the first document is determined. In one example, the portion of the first document may correspond with one or more pages of the first document (e.g., pages two and three of the first document out of twenty pages total). In another example, the portion of the first document may correspond with one or more paragraphs of the first document less than all of the paragraphs within the first document. In step 432, it is detected that a document verification request for the portion of the first document should be transmitted to the first document owner of the one or more document owners based on the number of document views for the portion of the first document and/or the number of crosslink messages that reference the portion of the first document.

In step 434, the document verification request for the portion of the first document is transmitted to the first document owner. In step 436, it is detected that the portion of the first document has been verified for a second period of time by the first document owner. In one example, the document verification request may correspond with the second suggested action 308 in FIG. 3A to verify only a subset of pages of a document less than all of the pages of the document. In step 438, the searchable document stored within the search index is updated with a verified state for the portion of the first document for the second period of time. The portion of the first document may comprise one or more pages of the first document less than all the pages of the first document and the second period of time may comprise three weeks.

In step 440, it is detected that the first period of time has passed since the first document was pinned to the search query. In step 442, it is detected that the portion of the first document is in the verified state and that the portion of the first document has been accessed or viewed at least a threshold number of times since the first document was pinned to the search query. In one example, it may be detected that the portion of the first document has been accessed at least ten times by users with ten different usernames or user identifiers. In step 444, it is determined that the document pinning of the first document to the search query should be automatically renewed in response to detection that the portion of the first document is in the verified state and/or that the portion of the first document has been accessed at least a threshold number of times since the first document was pinned to the search query. In step 446, the searchable document corresponding with the first document is updated with the search query for a third period of time (e.g., for an additional week or a third period of time less than the first period of time). In this case, the updating of the first document with the pinned search query for the third period of time may correspond with the automatic renewal of the document pinning made in step 426.

Figure 5A:
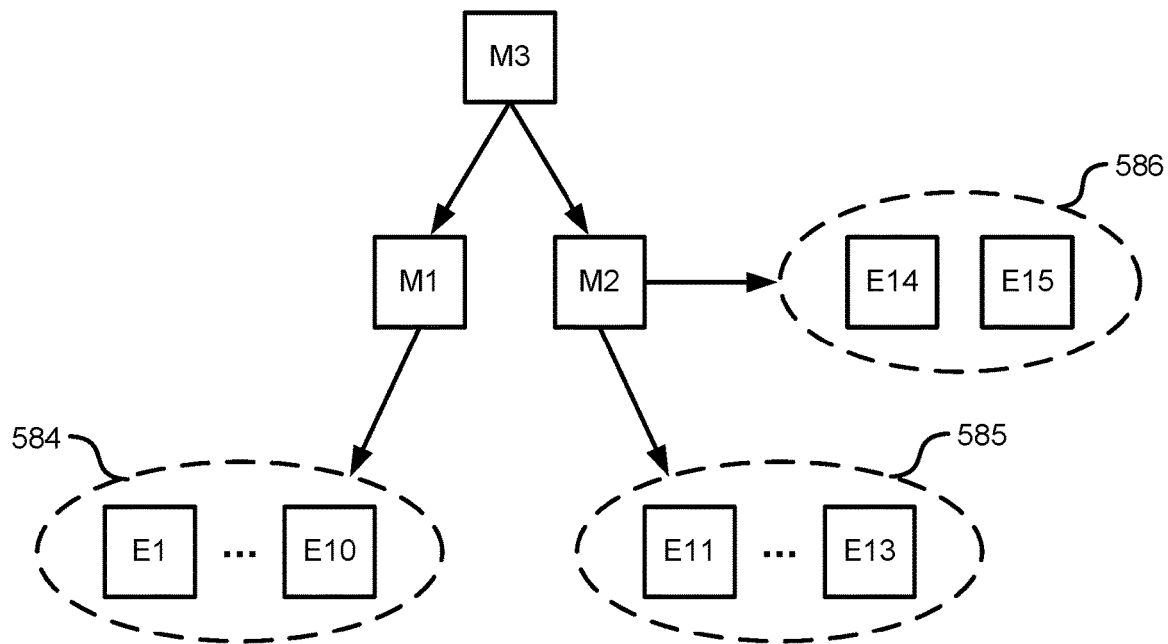
FIG. 5A depicts one embodiment of a directed graph with nodes corresponding with members or individuals of an organization.

FIG. 5A depicts one embodiment of a directed graph with nodes corresponding with members or individuals of an organization. The organization may comprise different groups of individuals. The directed graph may represent a group hierarchy of those different groups. As depicted, the organization includes employees E1 through E15 and managers M1 through M3. The directed edges from manager M3 to managers M1 and M2 represent a hierarchical structure in which managers M1 and M2 report to manager M3. Similarly, employees E1 through E10 report to manager M1 and employees E11 through E15 report to manager M2. Employees E1 through E10 have been assigned to a first group 584. Employees E11 through E13 have been assigned to a second group 585. Employees E14 and E15 have been assigned to a third group 586. As depicted in FIG. 5A, the number of individuals assigned to the first group 584 comprises ten individuals, the number of individuals assigned to the second group 585 comprises three individuals, and the number of individuals assigned to the third group 586 comprises two individuals. A relationship distance between two individuals (e.g., between two different employees) may correspond with the number of edges between the two individuals within the directed graph. In one example, the relationship distance between employee E1 and manager M3 is two. In another example, the relationship distance between employee E1 and employee E11 is four. In another example, the relationship distance between employee E1 and employee E11 is four. In another example, the relationship distance between employee E1 and employee E10 is zero.

In one embodiment, the ranking of documents that have been verified by individuals within the same group as a search query submitter may be ranked above other documents that have not been verified, that have not been set into a verified state, or that have been only verified by individuals outside the group (e.g., by individuals that have not been assigned to the same group). In one example, search results for a search query submitted by employee E1 may rank documents verified by employees E2 through E10 above other documents verified by employees E11 through E15. In another embodiment, the ranking of documents that have been verified by individuals within the same group or that are within a relationship distance of one (e.g., at most one edge separates the individuals) as a search query submitter may be ranked above other documents that have not been set into a verified state or that have been verified by other individuals that have a relationship distance of two or more from the search query submitter.

In one embodiment, during the ranking of relevant documents for a search query, the weighting of documents that have pinned search queries from individuals within the same group as a search query submitter may be ranked above other documents that have not been pinned or that have pinned search queries from individuals that do not belong to the same group as the search query submitter. In one example, search results for a search query submitted by employee E1 may rank a first document with a matching pinned search query by employee E2 higher than a second document with a matching pinned search query by employee E14. The matching pinned search query may comprise a semantic match between the pinned search query and the submitted search query. In another embodiment, the ranking of documents that have pinned search queries from individuals within the same group or that are within a relationship distance of two (e.g., at most two edges separates the individuals) of the search query submitter may be ranked above other documents that do not have pinned search queries or that have pinned search queries from other individuals that have a relationship distance of three or more from the search query submitter.

Figure 5B:
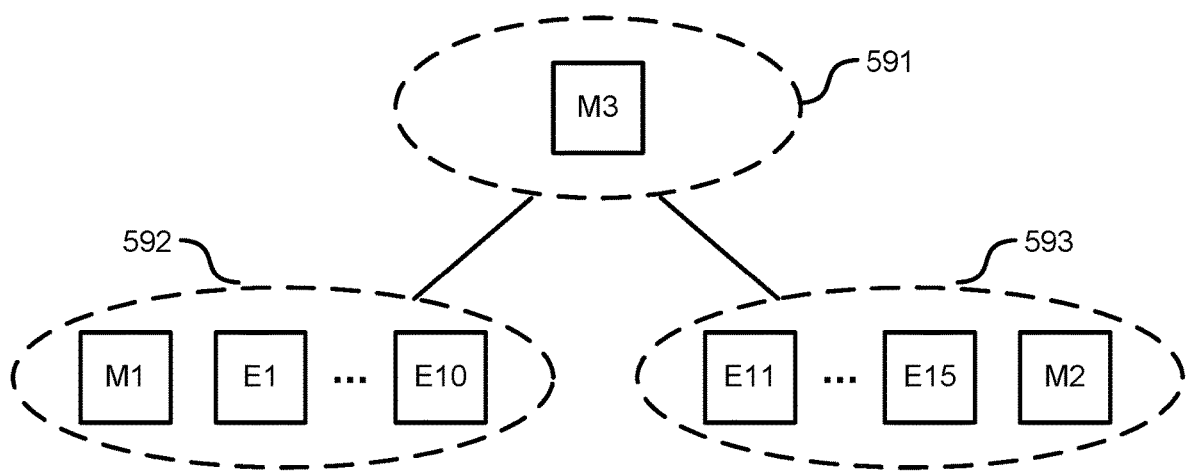
FIG. 5B depicts one embodiment of an undirected graph with nodes corresponding with the employees E1 through E15 and managers M1 through M3.

FIG. 5B depicts one embodiment of an undirected graph with nodes corresponding with the employees E1 through E15 and managers M1 through M3. The undirected edges represent group relationships between different groups of individuals (e.g., project groupings of individuals). As depicted, manager M1 and employees E1 through E10 may be assigned to a first project group 592 and manager M2 and employees E11 through E15 may be assigned to a second project group 593. The number of individuals assigned to the first project group 592 comprises 11 individuals and the number of individuals assigned to the second project group 593 comprises six individuals. Both the first project group 592 and the second project group 593 may comprise children groups under a parent group 591 that comprises manager M3. In this case, a relationship distance between manager M1 and manager M2 may correspond with the two edges separating the first project group 592 from the second project group 593.

In some embodiments, for a searchable document stored within a search index, the popularity of the document as a function of user activity may be determined based on the user activity of the search query submitter and the user activity of fellow group members over a period of time (e.g., over the past two weeks). The period of time over which the document popularity is determined may be set based on the number of individuals within the group assigned to the search query submitter. In one embodiment, the time period for gathering user activity statistics may be adjusted from a first number of days (e.g., 30 days) to a second number of days (e.g., 60 days) greater than the first number of days if a group has less than ten individuals assigned to it. If the size of the group that the search query submitter belongs to is less than ten people, then the user activity statistics for calculating document popularity may be taken over a longer time duration. In reference to FIG. 5A, the time period for gathering user activity statistics for determining document popularity may be set to 30 days if employee E1 performs a search because the first group 584 has ten or more individuals and set to 60 days if employee E14 performs a search because the third group 586 has less than ten individuals assigned to it.

In another embodiment, the number of groups used to calculate document popularity may be determined based on the number of individuals within the group assigned to the search query submitter. In one example, if the group size of the group assigned to the search query submitter is greater than or equal to ten individuals, then the user activity statistics may be acquired from only the immediate group to which the search query submitter is assigned; however, if the group size of the group assigned to the search query submitter is less than ten individuals, then the user activity statistics may be acquired from the immediate group to which the search query submitter is assigned and from other groups that are closely related to the immediate group (e.g., that have a relationship distance that is two or less). In reference to FIG. 5A, document popularity may be determined using the user activity statistics from only the first group 584 if employee E1 performs a search because the first group 584 has ten or more individuals, whereas document popularity may be determined using the user activity statistics from the second group 585 and the third group 586 if employee E11 performs a search because the second group 585 has less than ten individuals. In this case, the second group 585 and the third group 586 have a relationship distance of two (e.g., are separated by two edges).

In another embodiment, the number of groups used to calculate document popularity may be determined based on the total number of searches over a period of time (e.g., within the past week) performed by individuals within the group assigned to the search query submitter and/or other groups within an organization. In reference to FIG. 5A, if a search is performed by employee E11 and the number of searches performed by the individuals in the second group 585 over the past week is greater than 400, then document popularity may be determined using the user activity statistics from only the second group 585; however, if a search is performed by employee E11 and the number of searches performed by the individuals in the second group 585 over the past week is not greater than 400, then document popularity may be determined using the user activity statistics from both the second group 585 and the third group 586 (e.g., taking into consideration the user activity from groups that have a relationship distance of two or less). In some cases, if a search is performed by employee E11 and the number of searches performed by the individuals in the second group 585 and the third group 586 over the past week is not greater than 400, then document popularity may be determined using the user activity statistics from the second group 585, the third group 586, and the first group 584 (e.g., taking into consideration the user activity from groups that have a relationship distance of four or less). The relationship distance may be increased and groups added until the number of searches performed by individuals within the groups over the past week is greater than 400 (or some other threshold number of searches).

In another embodiment, the number of groups used to calculate document popularity may be determined based on the amount of user activity over a period of time (e.g., over the past two weeks) performed by individuals within the group assigned to the search query submitter and/or other groups within an organization. The amount of user activity may be associated with a user activity score for a particular individual or individuals within the group assigned to the search query submitter. The user activity score may comprise a summation of various user activity metrics, such as the summation of a first number of recent document downloads, a second number of likes, a third number of shares, and a fourth number of comments. In one example, the second number of likes and the fourth number of comments may correspond with likes and comments made in a persistent chat channel by individuals within a group assigned to the search query submitter. In reference to FIG. 5A, if a search is performed by employee E11 and the user activity score for the individuals in the second group 585 over the past two weeks is greater than 2000, then document popularity may be determined using the user activity statistics from only the second group 585; however, if a search is performed by employee E11 and the user activity score for the individuals in the second group 585 over the past two weeks is not greater than 2000, then document popularity may be determined using the user activity statistics from both the second group 585 and the third group 586 (e.g., by increasing the maximum relationship distance to two and taking into consideration the user activity from groups that have a relationship distance of at most two from the group assigned to the search query submitter). The maximum relationship distance from the group assigned to the search query submitter may be incrementally increased and groups added until the user activity score for individuals within the groups over the past two weeks is greater than 2000.

Figure 5C:
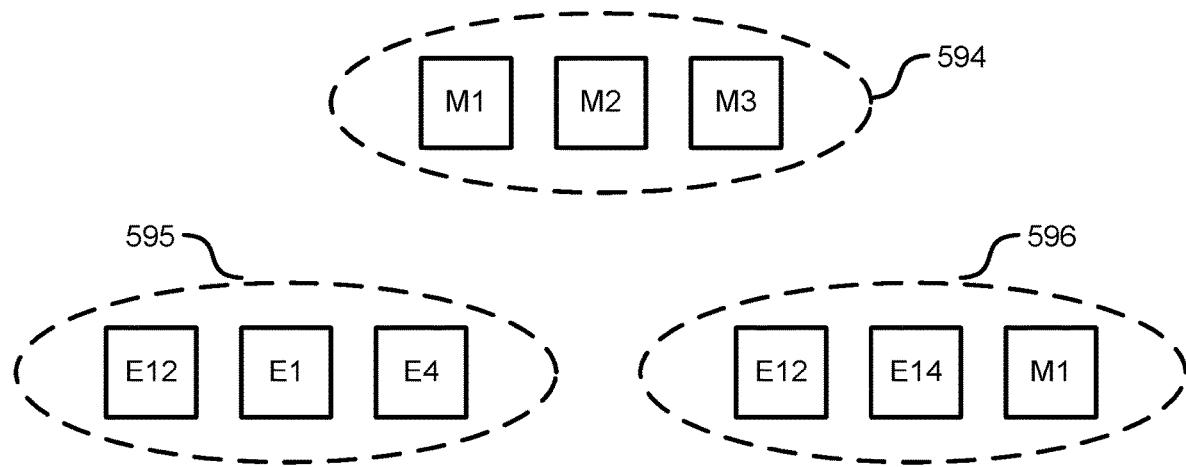
FIG. 5C depicts one embodiment of a plurality of people clusters.

FIG. 5C depicts one embodiment of a plurality of people clusters corresponding with subsets of the employees E1 through E15 and managers M1 through M3. The assignment of individuals to a particular people cluster may be determined based on collaboration activity. In some cases, a close working relationship may be inferred due to frequent collaboration on documents or tickets and/or frequent work-related communication within a communication channel. As depicted, managers M1-M3 have been assigned to a first people cluster 594 because they each co-edited or viewed a set of documents during a first time period. In one example, managers M1-M3 may have co-edited a spreadsheet for at least a week. Employees E12, E1, and E4 have been assigned to a second people cluster 595 because they have messaged each other within a persistent chat channel at least twenty times within the past three days. Manager M1, employee E12, and employee E14 have been assigned to a third people cluster 596 because they have co-edited a word processing document together for at least two weeks. Although the individuals within the third people cluster 596 do not all share the same manager or have not been assigned to the same group membership, the third people cluster 596 has been automatically created due to the degree of collaboration activity with the word processing document.

Figure 5D:
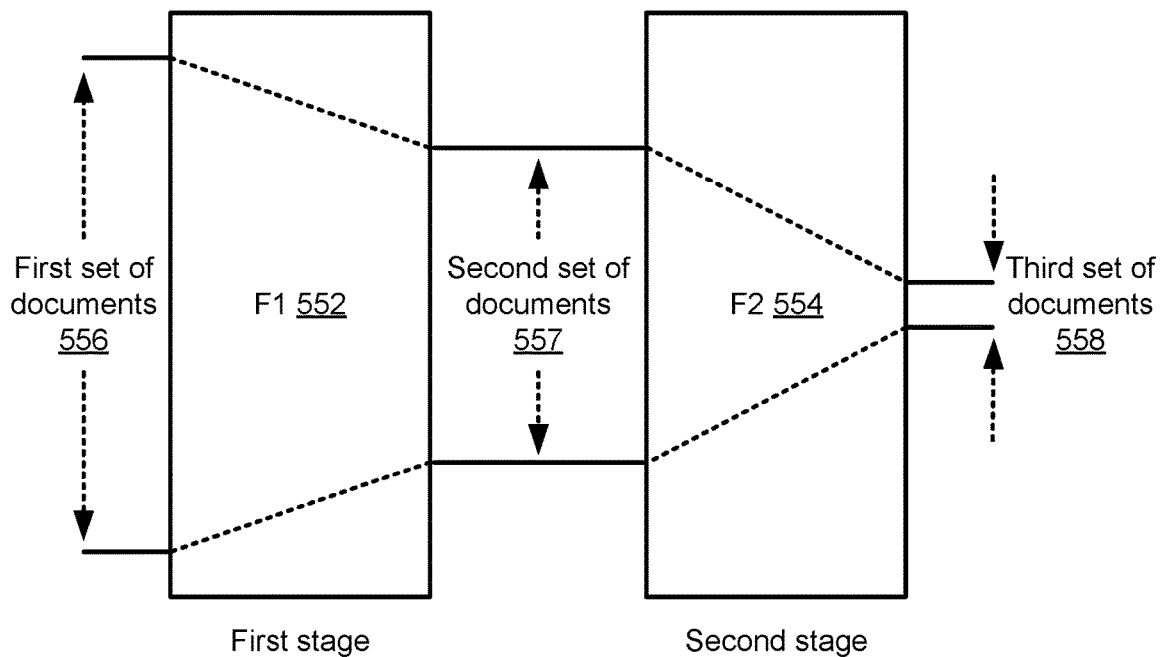
FIG. 5D depicts one embodiment of a staged approach for identifying sets of relevant documents for a given search query.

FIG. 5D depicts one embodiment of a staged approach for identifying sets of relevant documents for a given search query. The search query may include one or more search query terms. As depicted, a second set of documents 557 is selected from a first set of documents 556 using a first scoring function F1 552 to generate a first set of relevance scores for the first set of documents 556. The second set of documents 557 may comprise a subset of the first set of documents 556 that have relevance scores above a first threshold score. The first scoring function F1 552 may generate the first set of relevance scores using a first set of ranking factors, such as the presence of one or more search query terms within a title or summary of a document, how recently a document was updated with one or more search query terms, the term frequency or the number of times that one or more search query terms appear within a document, the source rating for a document, and a term proximity for one or more search query terms within a document. In one example, the first set of documents 556 may comprise searchable documents within a search index and a first set of relevance scores may be generated for the searchable documents within the search index using the first scoring function F1 552. The first set of documents 556 may then be ranked using the first set of relevance scores and a subset of the first set of documents 556 may be identified with at least the first threshold score. The first threshold relevance score may be set such that the second set of documents 557 comprises a particular percentage (e.g., ten percent) of the first set of documents 556.

Subsequently, a third set of documents 558 is selected from the second set of documents 557 using a second scoring function F2 554 to generate a second set of relevance scores for the second set of documents 557. The third set of documents 558 may comprise a subset of the second set of documents 557 that have relevance scores above a second threshold score. The second scoring function F2 554 may generate a second set of relevant scores using a second set of ranking factors. In one example, the number of ranking factors used for the second set of ranking factors may be greater than the number of ranking factors used for the first set of ranking factors. The second set of documents 557 may be ranked using the second set of relevance scores and a subset of the second set of documents 557 may be identified with at least the second threshold score.

In some embodiments, the first scoring function F1 552 may only consider a subset of the data associated with the first set of documents 556, such as a few lines of body text, titles, metadata descriptions, and incoming anchor text, while the second scoring function F2 554 may consider all data associated with the second set of documents 557. As the number of documents is reduced, the number of document elements or the amount of data associated with each document during application of a scoring function may be increased. In some cases, a third stage not depicted with a third scoring function may be used to further refine the third set of documents 558 to obtain a fourth set of relevant documents for the given search query.

Figure 5E:
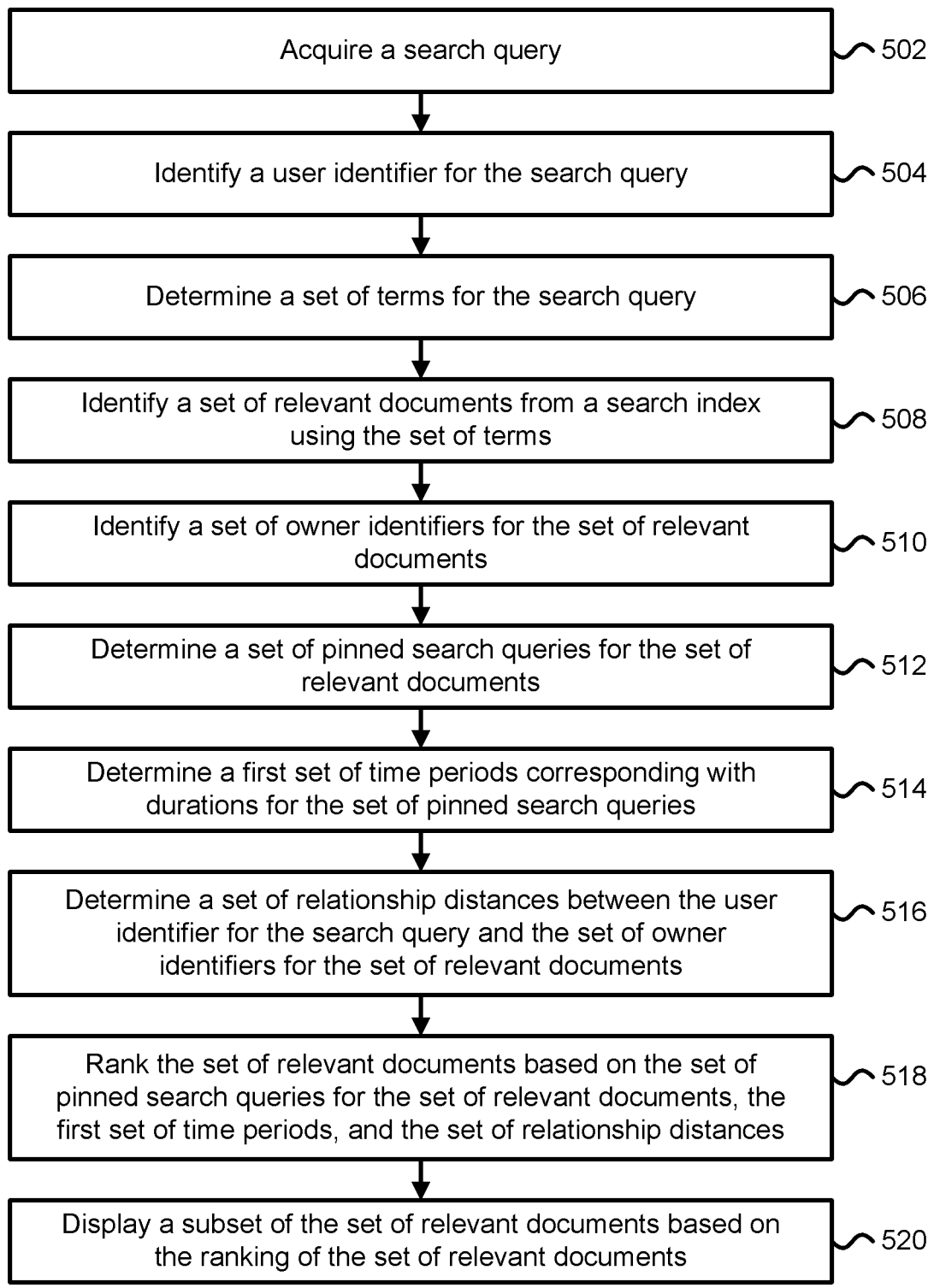
FIG. 5E depicts a flowchart describing one embodiment of a process for generating and displaying search results for a given search query.

FIG. 5E depicts a flowchart describing one embodiment of a process for generating and displaying search results for a given search query. In one embodiment, the process of FIG. 5E may be performed by a search and knowledge management system, such as the search and knowledge management system 120 in FIG. 1 or the search and knowledge management system 220 in FIG. 2A. In another embodiment, the process of FIG. 5E may be implemented using a cloud-based computing platform or cloud-based computing services.

In step 502, a search query is acquired. The search query may be acquired by a search and knowledge management system, such as the search and knowledge management system 220 in FIG. 2A. The search query may be acquired from a computing device, such as computing device 154 in FIG. 1. The search query may be entered on the computing device and submitted to a search and knowledge management system. In step 504, a user identifier for the search query is identified. The search query may be inputted and submitted by a user of a computing device, such as computing device 154 in FIG. 1, using a search bar, such as the search bar 312 in FIG. 3A. The user identifier may correspond with a username for the user, such as the username 314 in FIG. 3A. In step 506, a set of terms for the search query is determined. The set of terms may comprise a set of words or a set of tokens that derive from the search query. In one embodiment, the search query may be acquired as a string of characters and machine learning and/or natural language processing techniques may be used to determine the set of terms from the string of characters.

In step 508, a set of relevant documents is identified from a search index using the set of terms. The set of relevant documents may comprise searchable documents within the search index with at least a threshold relevance score or at least a threshold number of matching terms from the set of terms (e.g., at least two terms within the set of terms are found in each of the set of relevant documents). The relevance score may be calculated for each indexed document within the search index using a number of factors or criteria, such as the presence of one or more terms from the set of terms within a title or summary of an indexed document, whether one or more terms from the set of terms have particular formatting within an indexed document (e.g., whether a term has been underlined or italicized), how recently an indexed document was updated and whether one or more terms of the set of terms were added within a particular period of time (e.g., a searched term was added within the past week), the term frequency or the number of times that one or more terms from the set of terms appears within an indexed document, the source rating for an indexed document (e.g., a word processing document or presentation slides may have a higher source rating than an electronic message), and a term proximity for the set of terms within an indexed document.

In step 510, a set of owner identifiers for the set of relevant documents is identified. Each document within the search index may correspond with one or more document owners. The document owner of a particular document may be identified based on file permissions or access rights to the particular document. In one example, metadata for the particular document may specify a document owner or specify one or more document owners with read and write access to the particular document. In another example, an access control list for the particular document may specify the document owner or specify one or more usernames with read and write access to the particular document.

In step 512, a set of pinned search queries for the set of relevant documents is determined. In one embodiment, at least a subset of the set of relevant documents may have corresponding pinned search queries that were attached by their document owners. In one example, a pinned search query may correspond with the user-specified search query 344 depicted in FIG. 3D. Each pinned search query of the set of pinned search queries may correspond with a pin expiration date. In step 514, a first set of time periods corresponding with durations for the set of pinned search queries is determined. The first set of time periods may correspond with time durations during which the set of pinned search queries are valid. In one example, a first pinned search query of the set of pinned search queries may expire within a week while a second pinned search query of the set of pinned search queries may expire within a month. In another example, a first pinned search query of the set of pinned search queries may correspond with a first time period (e.g., for 15 days) of the first set of time periods during which the first pinned search query is valid and a second pinned search query of the set of pinned search queries may correspond with a second time period (e.g., for 60 days) of the first set of time periods during which the second pinned search query is valid.

In step 516, a set of relationship distances between the user identifier for the search query identified in step 504 and the set of owner identifiers for the set of relevant documents identified in step 510 is determined. In this case, the set of relationship distances may include a first relationship distance that corresponds with the number of edges between a first individual associated with the user identifier and a second individual associated with an owner identifier for one of the set of relevant documents. In step 518, the set of relevant documents is ranked based on the set of pinned search queries for the set of relevant documents, the first set of time periods, and/or the set of relationship distances. The set of relevant documents may be ranked based on search query affinity or similarity with the set of pinned search queries for the set of relevant documents. The ranking of the set of relevant documents may boost documents with recent pinned search queries over other documents with older pinned search queries, may boost documents with pinned search queries that match or have a high degree of similarity with the search query or the set of terms for the search query, and may boost documents with pinned search queries that have a high degree of similarity with the search query that were created by individuals assigned to the same group as the individual with the user identifier for the search query. A pinned search query may have a high degree of similarity with the search query if at least a threshold number of terms (e.g., at least two) appear in both the pinned search query and the search query submitted by the individual with the user identifier.

In one embodiment, documents with pinned search queries from individuals assigned to the same group as the user associated with the user identifier for the search query may be boosted over other documents without pinned search queries or that have pinned search queries from other individuals with relationship distances greater than one. In another embodiment, documents with pinned search queries that were pinned within a past threshold period of time (e.g., within the past week) may be boosted over other documents that were pinned prior to the past threshold period of time (e.g., that were pinned more than a month ago) or that have never been pinned.

In step 520, a subset of the set of relevant documents is displayed based on the ranking of the set of relevant documents. In one example, the subset of the set of relevant documents may comprise the first ten documents with the highest rankings. The subset of the set of relevant documents may be displayed using a display of a computing device, such as the computing device 154 in FIG. 1.

In some embodiments, the set of pinned search queries for the set of relevant documents may comprise one pinned search query for each of the set of relevant documents. In one example, each relevant document of the set of relevant documents may correspond with only one pinned search query (e.g., that was set by a document owner of a relevant document). In other embodiments, a relevant document may correspond with a plurality of pinned search queries that were set by a plurality of users of the search and knowledge management system. In one example, the relevant document may comprise a spreadsheet with a first document pin set by a document owner of the spreadsheet, a second document pin set by a co-worker of the document owner, and a third document pin set by another user of the search and knowledge management system different from the document owner and the co-worker. In some embodiments, a first set of relevant documents that each have at least a first number of document pins (e.g., at least five pins per document) may be boosted over a second set of relevant documents that each have less than the first number of document pins. A higher number of pins per document may correspond with documents with higher value or greater interest within an organization. In other embodiments, a first set of relevant documents that each have had at least a first number of document pins set within a first period of time (e.g., have had at least four pins set within the past week) may be boosted over a second set of relevant documents that have not had at least the first number of document pins set within the first period of time.

Figure 5F:
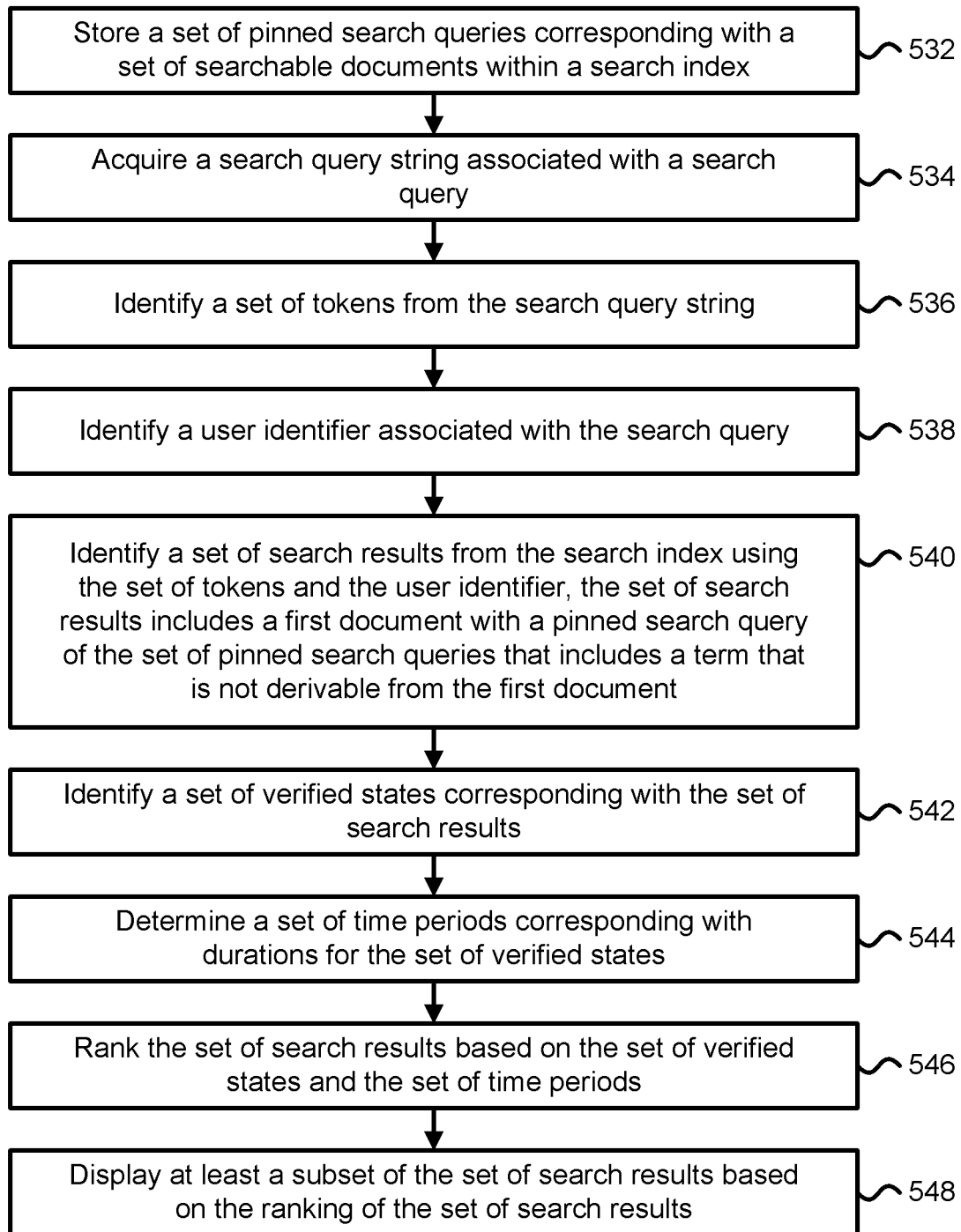
FIG. 5F depicts a flowchart describing an alternative embodiment of a process for generating and displaying search results for a given search query.

FIG. 5F depicts a flowchart describing an alternative embodiment of a process for generating and displaying search results for a given search query. In one embodiment, the process of FIG. 5F may be performed by a search and knowledge management system, such as the search and knowledge management system 120 in FIG. 1 or the search and knowledge management system 220 in FIG. 2A. In another embodiment, the process of FIG. 5F may be implemented using a cloud-based computing platform or cloud-based computing services.

In step 532, a set of pinned search queries corresponding with a set of searchable documents is stored within a search index. The search index may correspond with search index 204 in FIG. 2B. Each searchable document of the set of searchable documents may be pinned to one of the set of pinned search queries. The set of pinned search queries may comprise a first pinned search query that is attached to a first document of the set of searchable documents. The first pinned search query may correspond with the pinned user-specified search query 344 in FIG. 3D. In step 534, a search query string associated with a search query is acquired. The search query string may be entered and submitted via a search bar, such as the search bar 312 in FIG. 3A. In step 536, a set of tokens is identified from the search query string. The set of tokens may comprise a set of words or a set of terms that are derived from the search query string. Natural language processing techniques may be used to identify the set of tokens. In step 538, a user identifier associated with the search query is identified. The user identifier may correspond with a username for the user, such as the username 314 in FIG. 3A. In step 540, a set of search results is identified from the search index using the set of tokens and the user identifier. The set of search results may comprise a set of relevant documents that are classified as relevant to the search query. The set of search results may correspond with searchable content within the search index including electronic files, word processing documents, database records, webpages, and electronic messages. The set of search results may be identified by generating a relevance score for each document within the search index based on the set of tokens and the user identifier and then identifying documents within the search index with a relevance score above a threshold score (e.g., with a relevance score of at least 1500). The user identifier may be used to calculate relationship distances or to determine which documents are owned by other individuals with the same group assignment (e.g., that are in the same group) as the individual with the user identifier in order to boost their relevance scores.

The set of search results may include a first document with a pinned search query of the set of pinned search queries that includes at least one term that is not derivable from the first document. A technical benefit of allowing a search user or a document owner to pin a document to a user-specified search query is that terms that are not found in the document or that cannot be derived from the contents of the document may be specified and subsequently searched in order to find the document or increase the likelihood of finding the document within search results. A term may be deemed to not be derivable from the contents of the document if the term does not comprise a semantic match with at least a portion of the contents or if the term does not comprise a synonym for the contents of the document.

In step 542, a set of verified states corresponding with the set of search results is identified. Each search result (e.g., comprising a link to an electronic document, webpage, or message) of the set of search results may be associated with one or more verified states that specify whether the content of the entire search result has been verified and is currently in a verified state or whether only a portion of the content of the search result is currently in the verified state. In step 544, a set of time periods corresponding with time durations for the set of verified states is determined. The set of time periods may be used to determine when a document was verified and how much longer the document will remain in a verified state before the document verification expires. In step 546, the set of search results is ranked based on the set of verified states and the set of time periods. In one embodiment, the ranking of the set of search results may comprise a ranked list of documents from the search index that are ranked based on whether the contents of a document are currently verified, the amount of time that remains until expiration of document verification, and/or the amount of time that has passed since expiration of document verification. In one example, the ranking of the set of search results may boost the ranking scores of documents that are currently verified. In another example, the ranking of the set of search results may boost the ranking scores of documents that are currently verified by a first amount and boost the ranking scores of other documents that were verified and that have not been expired for more than a threshold period of time (e.g., the document verification expired less than a week ago) by a second amount less than the first amount. In some embodiments, the ranking of the set of search results based on their document verification status may be performed as a last stage ranking that boosts the rank of highly relevant documents that were verified by individuals within the same group as the search query submitter.

In step 548, at least a subset of the set of search results is displayed. The subset of the set of search results may comprise the twenty highest ranking search results out of fifty search results. The subset of the set of search results may be displayed using a display of a computing device, such as computing device 154 in FIG. 1.

Figure 6A:
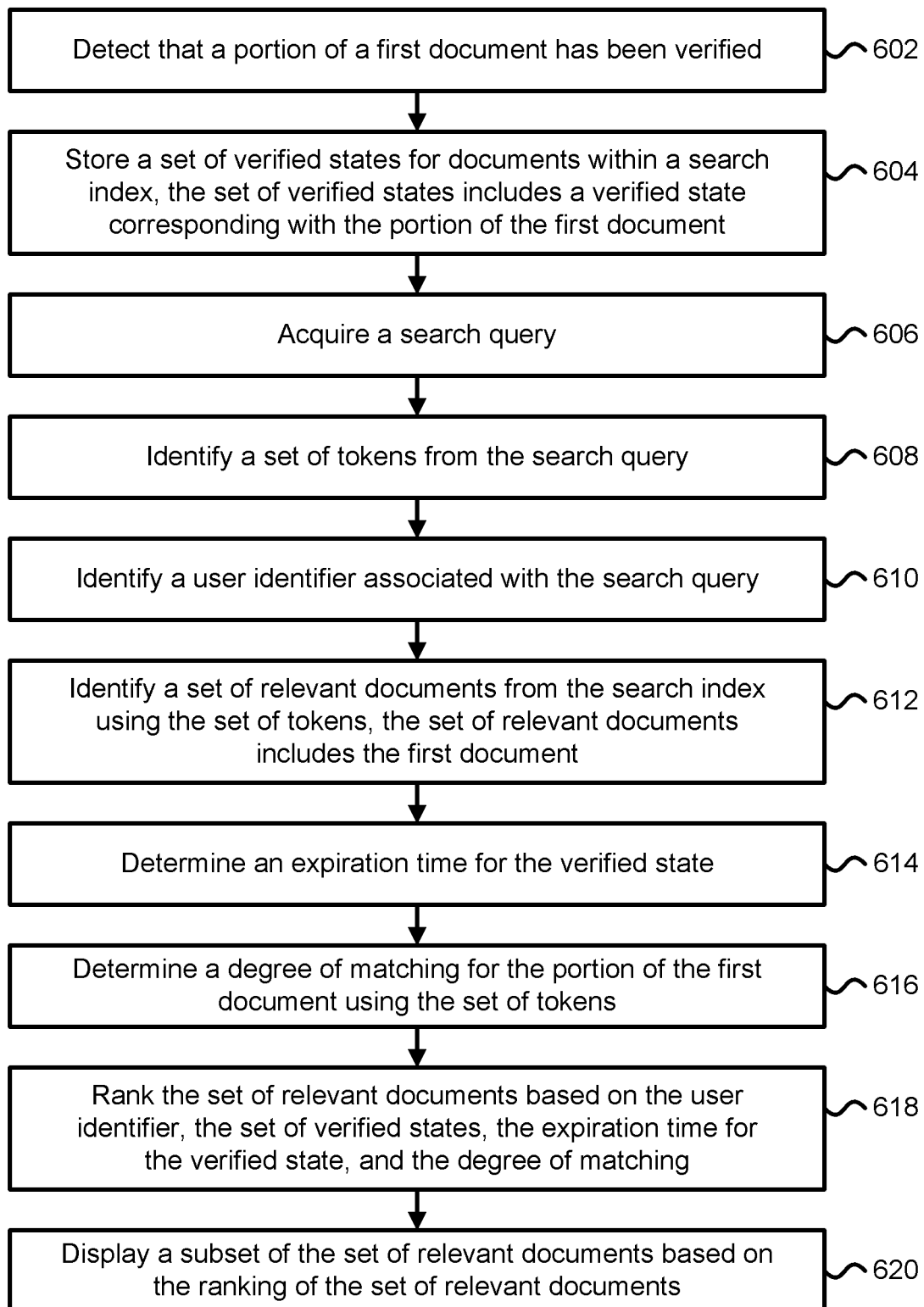
FIG. 6A depicts a flowchart describing one embodiment of a process for generating and displaying search results with partial document verification.

FIG. 6A depicts a flowchart describing one embodiment of a process for generating and displaying search results with partial document verification. In one embodiment, the process of FIG. 6A may be performed by a search and knowledge management system, such as the search and knowledge management system 120 in FIG. 1 or the search and knowledge management system 220 in FIG. 2A. In another embodiment, the process of FIG. 6A may be implemented using a cloud-based computing platform or cloud-based computing services.

In step 602, it is detected that a portion of a first document has been verified. The portion of the first document may comprise one or more paragraphs of text within the first document or one or more pages of the first document less than all the pages within the first document. In step 604, a set of verified states for documents within a search index is stored or updated. The set of verified states includes a verified state corresponding with the portion of the first document. In one example, the portion of the first document that has been verified may comprise multiple pages of the first document less than all of the pages within the first document. In step 606, a search query is acquired. In step 608, a set of tokens from the search query is identified. The set of tokens may comprise one or more search terms from the search query. In step 610, a user identifier associated with the search query is identified. The user identifier may comprise a unique username for a user submitting the search query. In step 612, a set of relevant documents is identified from the search index using the set of tokens. The set of relevant documents includes the first document. In step 614, an expiration time for the verified state corresponding with the portion of the first document is determined. The expiration time for the verified state may be determined based on a time stamp for when the verified state was set and a time duration for the verified state. In step 616, a degree of matching for the portion of the first document is determined using the set of tokens. The degree of matching may correspond with a number of times that one or more terms from the search query appear within the portion of the first document and/or the number of terms from the set of tokens that are within a threshold term proximity (e.g., within ten words) within the portion of the first document. In some cases, machine learning and/or natural language processing techniques may be used to determine a matching score corresponding with the degree of matching.

In some embodiments, when a portion of a document (e.g., only a single page) has been verified, then a ranking score for the document may be boosted if the verified portion of the document is relevant to the search query (e.g., if the portion of the document has at least a threshold relevance score for the search query on its own). For this reason, in some cases, when a portion of a document has been verified, then the entire content or text from the portion of the document may be written to the search index. In one example, a searchable document within a search index may initially store only a fraction of the text (e.g., less than a third of the text) from a portion of a document when the portion of the document has not been verified and then in response to detection that the portion of the document has been verified, a search and knowledge management system may store the entire text for the portion of the document in the search index. In another example, a document stored within a search index may not store any words or text for a portion of the document when the portion of the document is not in a verified state; upon detection that the portion of the document has been set into the verified state, then a search and knowledge management system may acquire and store all the words or all the text for the portion of the document within the search index.

In step 618, the set of relevant documents is ranked based on the user identifier, the set of verified states, the expiration time for the verified state, and/or the degree of matching for the portion of the first document. In one embodiment, the ranking of the set of relevant documents may comprise an ordering of the set of relevant documents based on whether a portion of a document is currently in a verified state and is relevant to a search query (e.g., that the portion of the document has been set into the verified state and meets at least a threshold relevance score), whether a document has been verified by an individual within the same group as the user who submitted the search query or has been verified by an individual within a particular relationship distance from the user who submitted the search query, and whether the portion of the document is in a verified state and includes at least a threshold number of terms from the search query (e.g., includes at least two terms). In one example, the ranking of the set of relevant documents may boost the ranking scores of documents that are currently verified by a first amount and boost the ranking scores of other documents that are currently verified and were verified by individuals within the same group as the user who submitted the search query by a second amount (e.g., by 3×) greater than the first amount (e.g., by 1.5×). In another example, the ranking of the set of relevant documents may boost the ranking scores of documents (e.g., by 2×) in which a portion of the document satisfies a threshold relevance score and the same portion of the document is currently in a verified state. In another example, the ranking of the set of relevant documents may boost the ranking scores of relevant documents if a portion of the document is currently in a verified state and includes text with at least a threshold number of terms from the search query.

In step 620, a subset of the set of relevant documents is displayed or outputted based on the ranking of the set of relevant documents. In one example, the subset of the set of relevant documents may comprise the top ten documents out of the set of relevant documents with the highest ranking scores. The subset of the set of relevant documents may be displayed using a display of a computing device, such as computing device 154 in FIG. 1.

Figure 6B:
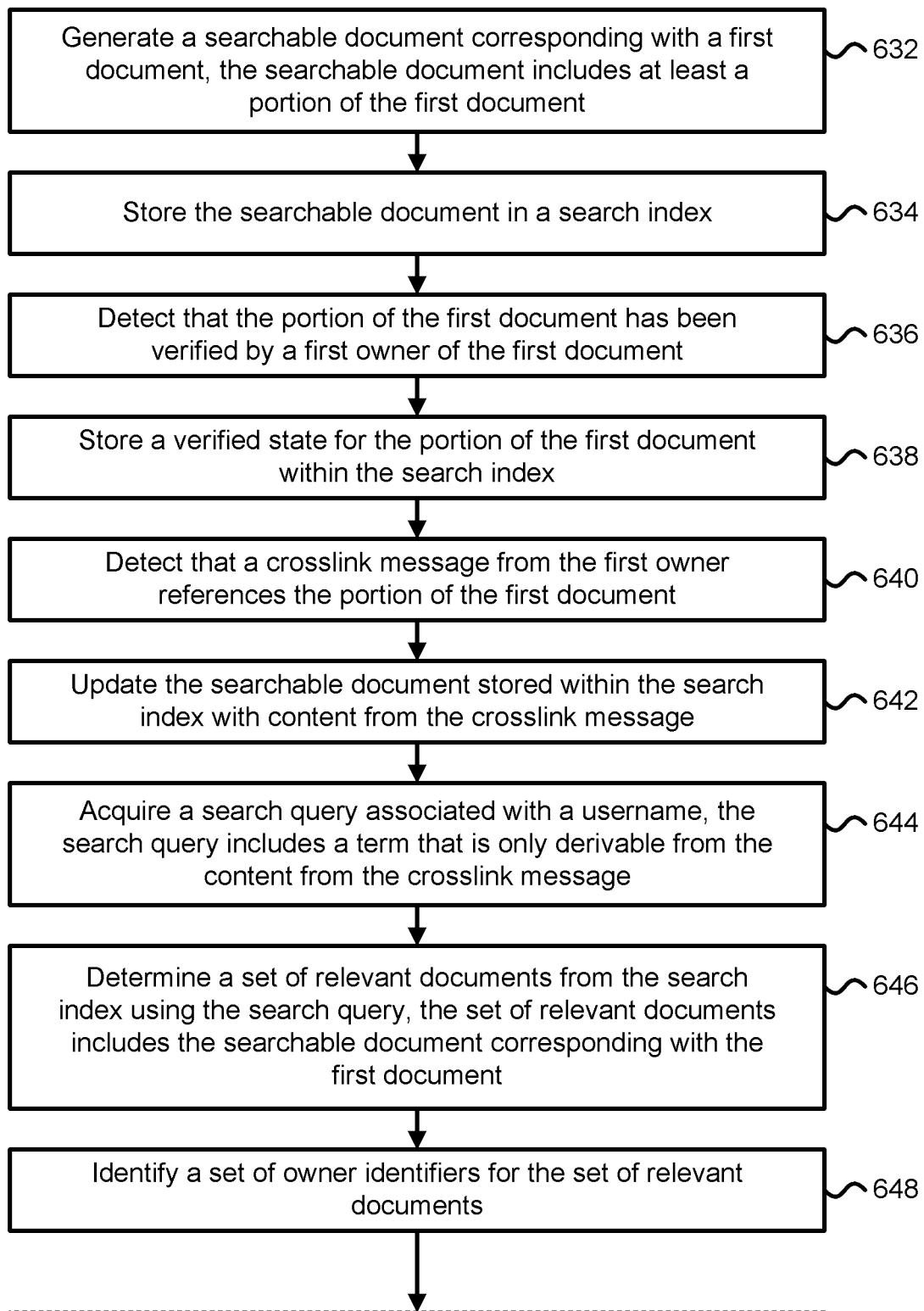
FIGS. 6B-6C depict a flowchart describing an alternative embodiment of a process for generating and displaying search results with partial document verification.
Figure 6C:
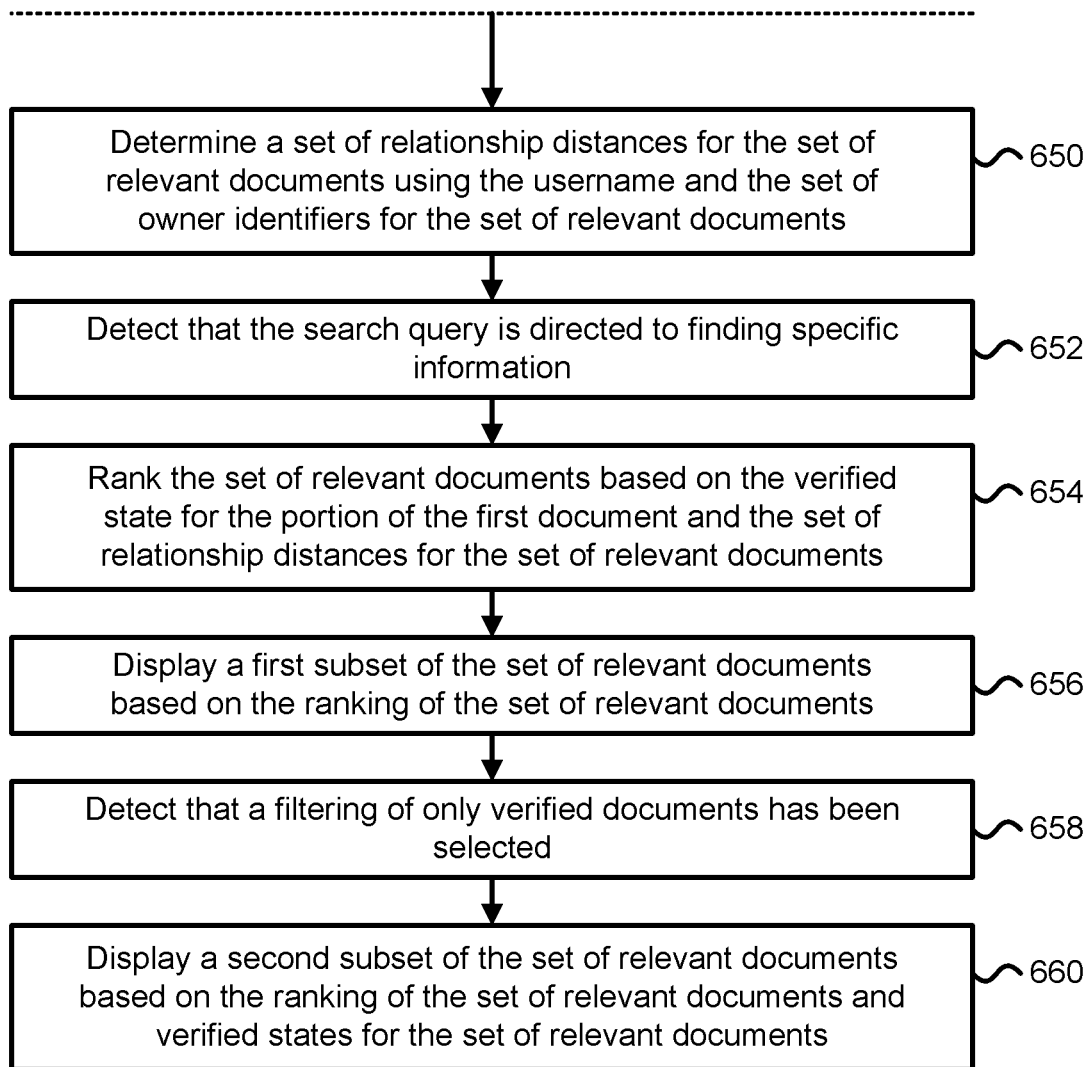

FIGS. 6B-6C depict a flowchart describing an alternative embodiment of a process for generating and displaying search results with partial document verification. In one embodiment, the process of FIGS. 6B-6C may be performed by a search and knowledge management system, such as the search and knowledge management system 120 in FIG. 1 or the search and knowledge management system 220 in FIG. 2A. In another embodiment, the process of FIGS. 6B-6C may be performed using a cloud-based computing platform or various cloud-based computing and data storage services.

In step 632, a searchable document corresponding with a first document is generated. The searchable document may comprise an indexed version of the first document that includes a summary of the first document, keywords from the first document, and access rights for the first document. The first document may comprise, for example, an electronic file, a webpage, a wiki, a spreadsheet, or a database entry. The searchable document may include at least a portion of the first document; the portion of the first document may comprise a paragraph or one or more sentences from the first document. The searchable document may include additional information related to the first document, such as document ownership information and access rights information. In one example, the searchable document may include text from the first document, metadata associated with the first document, an auto-generated summary of the first document, a verification status for the first document, and a pinned search query for the first document. In some case, the searchable document may remove common words or stop words that do not provide distinguishability from the first document.

In step 634, the searchable document is stored in a search index. The search index may correspond with the search index 204 in FIG. 2B. In step 636, it is detected that the portion of the first document has been verified by a first owner of the first document. In one example, the first owner of the first document may assert a partial document verification for the portion of the first document via a user interface widget from a search results page or from an application for viewing the first document. In step 638, a verified state for the portion of the first document is stored within the search index. In one embodiment, the verified state for the portion of the first document may be embedded within the searchable document that is stored within the search index. In another embodiment, a lookup table of verification states for searchable documents within the search index may store the verified state for the portion of the first document and a corresponding expiration date. In step 640, it is detected that a crosslink message from the first owner references the portion of the first document. In one embodiment, the crosslink message may comprise an electronic message (e.g., an email message, a text message, or a message associated with a persistent chat channel) that was submitted or transmitted by the first owner of the first document. It may be detected that the crosslink message references the portion of the first document based on the presence of a pointer to the portion of the first document embedded within the crosslink message.

In step 642, the searchable document stored within the search index is automatically updated with content from the crosslink message. The content may comprise text from the crosslink message. The text may be identified from a message body or text field associated with the crosslink message. In one example, the entire content of the crosslink message may be added to the searchable document or one or more sentences before and after the pointer to the portion of the first document may be added to the searchable document. In step 644, a search query associated with a username is acquired. The username may correspond with the user who submitted the search query or uniquely identify the user who submitted the search query. In some cases, the search query may include a term that is only derivable from the content of the crosslink message. In this case, updating the searchable document with the content from the crosslink message may be necessary in order to find the proper document for a search query that includes the term that is only derivable from the content of the crosslink message.

In step 646, a set of relevant documents from the search index is determined using the search query. The set of relevant documents includes the searchable document corresponding with the first document. The set of relevant documents may be identified as satisfying a particular relevance score. In step 648, a set of owner identifiers for the set of relevant documents is identified. In step 650, a set of relationship distances for the set of relevant documents is determined using the username and the set of owner identifiers for the set of relevant documents. In one embodiment, each document within the set of relevant documents may be assigned a relationship distance corresponding with a number of edges within an organizational graph between the user associated with the username and a document owner of the document. In another embodiment, each document within the set of relevant documents may be assigned a relationship distance corresponding with a minimum number of edges within a graph between the user associated with the username and two or more document owners of the document. In one example, in reference to FIG. 5A, a relevant document may provide ownership permissions to both employee E10 and E11; if the search is performed by employee E1, then the relationship distance for the relevant document may be calculated to be zero as both employee E11) and E1 have been assigned to the same group 584.

In step 652, it is detected that the search query is directed to finding specific information. In one example, the search query may be classified as seeking information from a particular document in contrast to seeking information in general from a number of documents. In some cases, the search query may be deemed to be directed to finding specific information if the search query is classified as a navigational search query for a specific document or website using natural language processing techniques. In some embodiments, the ranking of a relevant document may be boosted only if the search query is classified as a navigational search query or is deemed to be a search query that is directed to finding specific information and not information in general.

In step 654, the set of relevant documents is ranked based on the verified state for the portion of the first document and the set of relationship distances for the set of relevant documents. In one embodiment, a document within the set of relevant documents may be boosted in the rankings if the document is currently set into a verified state and a relationship distance between a document owner for the document and the individual associated with the username is less than three. In another embodiment, a document within the set of relevant documents may be boosted in the rankings if the document is in a verified state and a relationship distance between a document owner for the document and the user associated with the username is one or less. In another embodiment, a document within the set of relevant documents may be boosted in the rankings if the document is in a verified state and the search query is deemed to be directed to finding specific information. In step 656, a first subset of the set of relevant documents is displayed based on the ranking of the set of relevant documents from step 654. In step 658, it is detected that a filtering of only verified documents has been selected. The selection to display only relevant documents that are in a verified state may be made via suggested filters options, such as the suggested filters 346 in FIG. 3B. In step 660, a second subset of the set of relevant documents is displayed based on the ranking of the set of relevant documents and verified states for the set of relevant documents. In this case, the second subset may comprise the top ten highest ranking documents that are currently set into a verified state. The second subset of the set of relevant documents may be displayed using a display of a computing device, such as computing device 154 in FIG. 1.

Figure 7A:
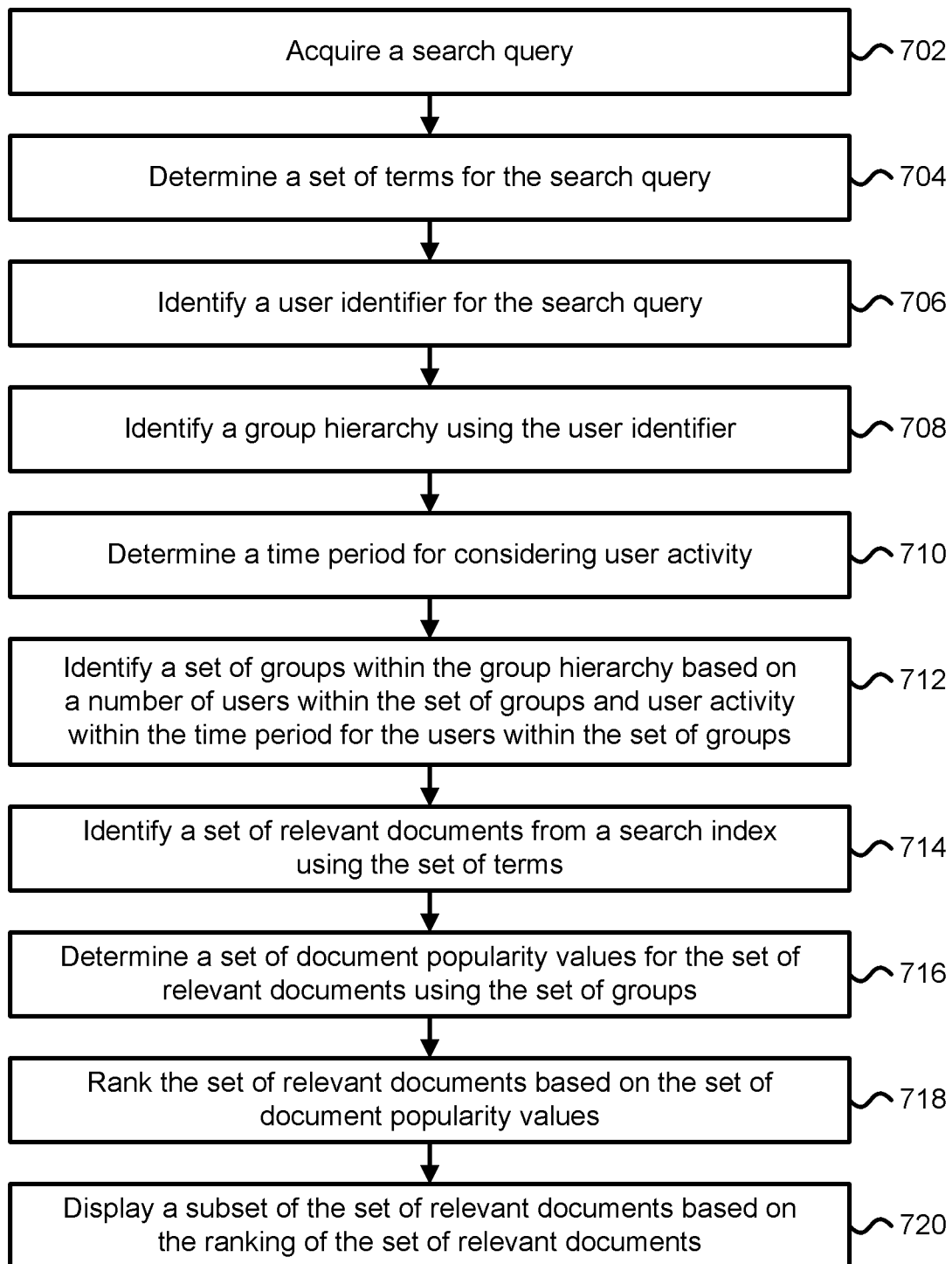
FIG. 7A depicts a flowchart describing one embodiment of a process for generating and displaying search results with user activity tracking and scoring across group hierarchies.

FIG. 7A depicts a flowchart describing one embodiment of a process for generating and displaying search results with user activity tracking and scoring across group hierarchies. In one embodiment, the process of FIG. 7A may be performed by a search and knowledge management system, such as the search and knowledge management system 120 in FIG. 1 or the search and knowledge management system 220 in FIG. 2A. In another embodiment, the process of FIG. 7A may be implemented using a cloud-based computing platform or cloud-based computing services.

In step 702, a search query is acquired. The search query may be entered on a computing device, such as computing device 154 in FIG. 1, and submitted to a search and knowledge management system, such as the search and knowledge management system 220 in FIG. 2A. In step 704, a set of terms for the search query is determined. The set of terms may comprise a set of words that derive from the search query. In one embodiment, the search query may be acquired as a string of characters and machine learning and/or natural language processing techniques may be used to determine the set of terms from the string of characters.

In step 706, a user identifier for the search query is identified. The user identifier may comprise a username for the individual executing the search query. In step 708, a group hierarchy is identified using the user identifier. In one example, an individual associated with the user identifier may be assigned to a particular group within an organization and the particular group may comprise one group of multiple groups within a group hierarchy. In reference to FIG. 5A, the individual may correspond with employee E1 of the first group 584 and the group hierarchy may correspond with the hierarchy of groups within the directed graph. In step 710, a time period for considering user activity is determined. In one embodiment, the time period for considering user activity may be determined based on a time of day (or day of the week). For example, if the search query is executed during working hours, then the time period may be set to six hours; however, if the search query is executed during non-working hours, then the time period may be set to ten hours. In another embodiment, the time period for considering user activity may be determined based on a number of individuals within the group hierarchy. In one example, if the number of individuals within the group hierarchy is greater than a threshold number of individuals (e.g., is greater than 500), then the time period may be set to one week; however, if the number of individuals within the group hierarchy is not greater than the threshold number of individuals, then the time period for considering user activity may be increased to two weeks. As the overall number of individuals within the group hierarchy increases, the time period for considering user activity may decrease.

In step 712, a set of groups within the group hierarchy is identified based on a number of users within the set of groups and/or user activity within the time period for the users within the set of groups. In one example, the set of groups may be identified by finding a first group that includes an individual associated with the user identifier and incrementally increasing the relationship distance between the first group and other groups within the group hierarchy until the total number of individuals exceeds a threshold number of individuals. In reference to FIG. 5A, the individual associated with the user identifier may comprise employee E1 and the first group that includes the individual may comprise the first group 584. In the case that the threshold number of individuals comprises 12 individuals, then the set of groups may comprise the first group 584 and two groups corresponding with the managers M1 and M3. If managers are not considered as groups, then the set of groups may comprise the first group 584 and the third group 586. In another example, the set of groups may be identified by first identifying a first group that includes an individual associated with the user identifier and then adding groups incrementally by increasing the relationship distance from the first group until a user activity score reaches a threshold score.

In step 714, a set of relevant documents is identified from a search index using the set of terms for the search query. In step 716, a set of document popularity values for the set of relevant documents is determined using the set of groups. The set of document popularity values may be generated based on the user activity of the individuals within the set of groups. In one embodiment, the set of document popularity values may be calculated by performing a weighted summation of the number of downloads, likes, shares, accesses, and views for each document of the set of relevant documents. In one example, a first document of the set of relevant documents may have a first document popularity value that equals the number of downloads plus the number of views for the first document by individuals within the set of groups and a second document of the set of relevant documents may have a second document popularity value that equals the number of downloads plus the number of views for the second document by the individuals within the set of groups.

In step 718, the set of relevant documents is ranked based on the set of document popularity values. The ranking of the set of relevant documents may boost documents with higher document popularity scores over other documents. In step 720, a subset of the set of relevant documents is displayed based on the ranking of the set of relevant documents. In one example, the subset of the set of relevant documents may comprise the first twenty documents with the highest rankings. The subset of the set of relevant documents may be displayed using a display of a computing device, such as the computing device 154 in FIG. 1.

Figure 7B:
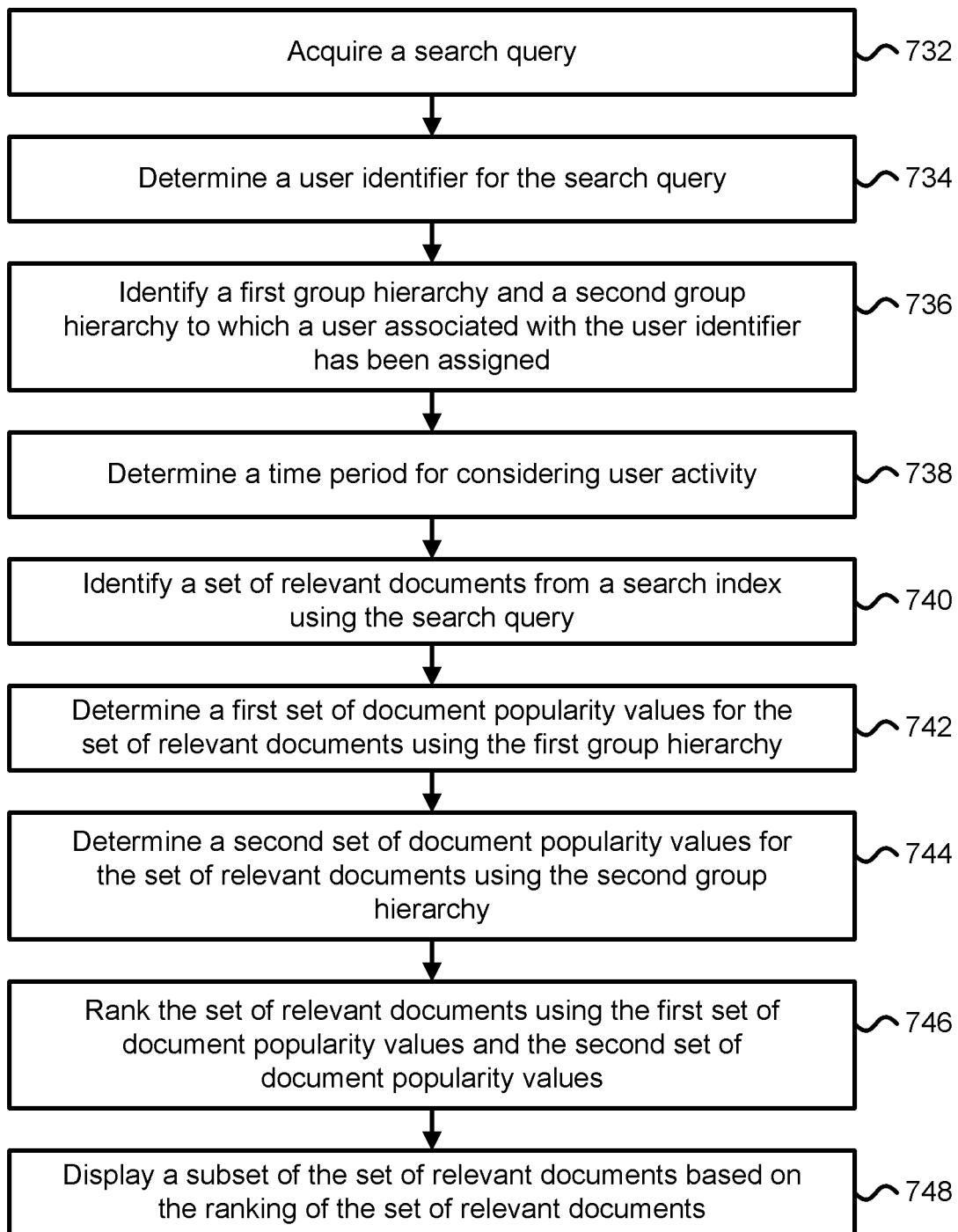
FIG. 7B depicts a flowchart describing another embodiment of a process for generating and displaying search results with user activity tracking and scoring across group hierarchies.

FIG. 7B depicts a flowchart describing another embodiment of a process for generating and displaying search results with user activity tracking and scoring across group hierarchies. In one embodiment, the process of FIG. 7B may be performed by a search and knowledge management system, such as the search and knowledge management system 120 in FIG. 1 or the search and knowledge management system 220 in FIG. 2A. In another embodiment, the process of FIG. 7B may be implemented using a cloud-based computing platform or cloud-based computing services.

In step 732, a search query is acquired. In step 734, a user identifier for the search query is determined. The user identifier may comprise a username for the individual executing the search query. In step 736, a first group hierarchy and a second group hierarchy to which a user (or individual) associated with the user identifier has been assigned are identified. In one example, the user associated with the user identifier may correspond with employee E1 in FIG. 5A, the first group hierarchy may correspond with the hierarchy of groups in FIG. 5A, and the second group hierarchy may correspond with the hierarchy of groups in FIG. 5B. The user associated with the user identifier may belong to two different group hierarchies within the same organization (e.g., the user may belong to a project related hierarchy and an organizational reporting hierarchy).

In step 738, a time period for considering user activity is determined. In step 740, a set of relevant documents is identified from a search index using the search query. In step 742, a first set of document popularity values for the set of relevant documents is determined using the first group hierarchy. In step 744, a second set of document popularity values for the set of relevant documents is determined using the second group hierarchy. The first set of document popularity values may be generated based on the user activity of individuals within a first set of groups within the first group hierarchy. In one embodiment, the first set of groups within the first group hierarchy may be determined based on a number of individuals within the first set of groups, a number of searches performed by the individuals within the first set of groups, and/or the user activity for the individuals within the first set of groups. The second set of document popularity values may be generated based on the user activity of individuals within a second set of groups within the second group hierarchy. In one example, the second set of document popularity values may be calculated by performing a weighted summation of the number of downloads, likes, shares, accesses, and/or views by the individuals within the second set of groups for each document of the set of relevant documents and the first set of document popularity values may be calculated by performing a weighted summation of the number of downloads, likes, shares, accesses, and/or views by the individuals within the first set of groups for each document of the set of relevant documents.

In step 746, the set of relevant documents is ranked using the first set of document popularity values and the second set of document popularity values. In step 748, a subset of the set of relevant documents is displayed based on the ranking of the set of relevant documents. In one example, the subset of the set of relevant documents may comprise the first twenty documents with the highest rankings. The subset of the set of relevant documents may be displayed using a display of a computing device, such as the computing device 154 in FIG. 1.

One embodiment of the disclosed technology includes storing a first document within a search index, acquiring a search query from a computing device, determining a set of terms for the search query, and identifying a set of relevant documents from the search index using the set of terms. The set of relevant documents includes the first document. The method further comprises determining a set of pinned search queries for the set of relevant documents. The set of pinned search queries includes a first pinned search query for the first document. The method further comprises determining a first set of time periods corresponding with durations for the set of pinned search queries, ranking the set of relevant documents based on the set of pinned search queries for the set of relevant documents and the first set of time periods, and displaying from the computing device at least a subset of the set of relevant documents based on the ranking of the set of relevant documents.

One embodiment of the disclosed technology includes a memory and one or more processors in communication with the memory. The memory configured to store a first document within a search index. The one or more processors configured to acquire a search query and determine a set of terms for the search query. The one or more processors configured to identify a set of relevant documents from the search index using the set of terms. The set of relevant documents includes the first document. The one or more processors configured to determine a set of pinned search queries for the set of relevant documents. The set of pinned search queries includes a first pinned search query for the first document. The one or more processors configured to determine a first set of time periods corresponding with expiration times for the set of pinned search queries and rank the set of relevant documents based on the set of pinned search queries for the set of relevant documents and the first set of time periods. The one or more processors configured to cause at least a subset of the set of relevant documents to be displayed subsequent to the set of relevant documents being ranked based on the set of pinned search queries for the set of relevant documents and the first set of time periods.

One embodiment of the disclosed technology includes storing a searchable document corresponding with a first document in a search index, detecting that a portion of the first document has been verified by a first owner of the first document, updating a set of verified states for searchable documents within the search index with a verified state for the portion of the first document in response to detecting that the portion of the first document has been verified, acquiring a search query from a computing device, identifying a set of terms from the search query, and determining a set of relevant documents from the search index using the set of terms from the search query. The set of relevant documents includes the first document. The method further comprises determining an expiration time for the verified state for the portion of the first document, ranking the set of relevant documents based on the set of verified states and the expiration time for the verified state, and displaying on the computing device a subset of the set of relevant documents based on the ranking of the set of relevant documents.

One embodiment of the disclosed technology includes a storage device and one or more processors in communication with the storage device. The storage device configured to store a searchable document corresponding with a first document within a search index. The one or more processors configured to detect that a portion of the first document has been verified by a first owner of the first document and update a set of verified states for searchable documents within the search index with a verified state for the portion of the first document in response to detection that the portion of the first document has been verified. The one or more processors configured to acquire a search query and identify a set of terms from the search query. The one or more processors configured to determine a set of relevant documents from the search index using the set of terms from the search query. The set of relevant documents includes the first document. The one or more processors configured to determine an expiration time for the verified state for the portion of the first document and rank the set of relevant documents based on the set of verified states and the expiration time for the verified state. The one or more processors configured to cause at least a subset of the set of relevant documents to be displayed subsequent to the set of relevant documents being ranked.

One embodiment of the disclosed technology includes acquiring a search query associated with a user identifier from a computing device, identifying a group hierarchy using the user identifier, determining a time period for considering user activity within the group hierarchy, identifying a set of groups within the group hierarchy based on user activity within the set of groups during the time period, identifying a set of relevant documents from a search index, determining a set of document popularity values for the set of relevant documents based on the user activity within the set of groups during the time period, ranking the set of relevant documents using the set of document popularity values, and displaying from the computing device a subset of the set of relevant documents based on the ranking of the set of relevant documents.

The term "document" may refer to an electronic document that is machine-readable and machine-storable. A document may comprise, for example, an electronic file, a database file, an email, or a file with embedded links to other files. A document may include textual information, as well as embedded information such as metadata, images, and hyperlinks.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a function programming language such as Scala, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a search system, comprising:
acquiring a search query from a computing device, the search query is associated with a user identifier;
identifying a first group within a group hierarchy to which the user identifier has been assigned;
determining a time period for considering user activity within the group hierarchy based on a number of individuals within the first group to which the user identifier has been assigned;
identifying a set of relevant documents from a search index based on the search query;
determining a set of document popularity values for the set of relevant documents based on the user activity within the group hierarchy during the time period;
ranking the set of relevant documents using the set of document popularity values; and
displaying from the computing device at least a subset of the set of relevant documents based on the ranking of the set of relevant documents.

2. The method of claim 1, further comprising:
identifying a set of groups within the group hierarchy based on user activity within the set of groups during the time period, the identifying the set of groups within the group hierarchy includes incrementally increasing a maximum relationship distance between the first group and other groups within the group hierarchy until a user activity score for the set of groups reaches a threshold score; and
determining the set of document popularity values for the set of relevant documents based on the user activity within the set of groups during the time period.

3. The method of claim 1, wherein:
the determining the set of document popularity values includes determining a number of downloads or views for each document of the set of relevant documents.

4. The method of claim 1, wherein:
the determining the time period for considering user activity within the group hierarchy is determined based on a time of day.

5. The method of claim 1, wherein:
the determining the set of document popularity values for the set of relevant documents includes determining a number of edits, downloads, and views of searchable content during the time period.

6. The method of claim 1, further comprising:
identifying a second group hierarchy using the user identifier;
determining a second set of document popularity values for the set of relevant documents using the second group hierarchy; and
ranking the set of relevant documents using the set of document popularity values and the second set of document popularity values.

7. The method of claim 2, wherein:
the user identifier comprises a username;
the set of groups comprises a plurality of groups; and
the computing device comprises a mobile computing device.

8. The method of claim 1, further comprising:
identifying a set of groups within the group hierarchy by incrementally increasing a maximum relationship distance between the first group and other groups within the group hierarchy until a total number of individuals within the set of groups exceeds a threshold number of individuals; and
determining the set of document popularity values for the set of relevant documents based on the user activity within the set of groups during the time period.

9. A search system, comprising:
a storage device configured to store a search index; and
one or more processors in communication with the storage device configured to:
  acquire a search query associated with a user identifier;
  identify a first group within a group hierarchy to which the user identifier has been assigned;
  determine a time period for considering user activity within the group hierarchy based on a number of individuals within the first group;
  identify a set of groups within the group hierarchy based on user activity within the set of groups during the time period;
  identify a set of relevant documents from the search index;
  determine a set of document popularity values for the set of relevant documents based on the user activity within the set of groups during the time period;
  rank the set of relevant documents using the set of document popularity values; and
  cause a subset of the set of relevant documents to be displayed based on the ranking of the set of relevant documents.

10. The search system of claim 9, wherein:
the one or more processors configured to identify the set of groups by incrementally increasing a maximum relationship distance between the first group and other groups within the group hierarchy until a user activity score for the set of groups reaches a threshold score.

11. The search system of claim 9, wherein:
the one or more processors configured to determine a first document popularity value of the set of document popularity values based on a number of views or shares for a first document of the set of relevant documents.

12. The search system of claim 9, wherein:
the one or more processors configured to determine a first document popularity value of the set of document popularity values based on a number of comments or likes associated with a first document of the set of relevant documents.

13. The search system of claim 9, wherein:
the one or more processors configured to determine the time period for considering user activity within the group hierarchy based on a time of day.

14. The search system of claim 9, wherein:
the one or more processors configured to determine the set of document popularity values for the set of relevant documents based on a number of edits, downloads, and views of searchable content during the time period.

15. The search system of claim 9, wherein:
the one or more processors configured to identify a second group hierarchy using the user identifier and determine a second set of document popularity values for the set of relevant documents using the second group hierarchy, the one or more processors configured to rank the set of relevant documents using the set of document popularity values and the second set of document popularity values.

16. The search system of claim 9, wherein:
the user identifier comprises a username.

17. The search system of claim 9, wherein:
the set of groups comprises a plurality of groups.

18. The search system of claim 9, wherein:
the one or more processors configured to identify the set of groups by incrementally increasing a maximum relationship distance between the first group and other groups within the group hierarchy until a total number of individuals within the set of groups exceeds a threshold number of individuals.

19. The search system of claim 9, wherein:
the group hierarchy corresponds with a directed graph.

20. One or more storage devices containing processor readable code for programming one or more processors to perform a method for operating a search system, the processor readable code comprising:
processor readable code configured to acquire a search query associated with a user identifier;
processor readable code configured to identify a first group within a group hierarchy to which the user identifier has been assigned;
processor readable code configured to determine a time period for considering user activity within the group hierarchy based on a number of individuals within the first group;
processor readable code configured to identify a set of relevant documents from a search index;
processor readable code configured to determine a set of document popularity values for the set of relevant documents based on the user activity within the group hierarchy during the time period;
processor readable code configured to rank the set of relevant documents using the set of document popularity values; and
processor readable code configured to cause at least a subset of the set of relevant documents to be displayed based on the ranking of the set of relevant documents.

* * * * *